(12) United States Patent
Zalusky et al.

(10) Patent No.: US 11,197,432 B1
(45) Date of Patent: Dec. 14, 2021

(54) DUCTING ASSEMBLY FOR DE-STRATIFICATION AND CONSOLIDATING EXCESS WATER AND NUTRIENTS

(71) Applicant: Integrated Hydro Solutions LLC, Kelseyville, CA (US)

(72) Inventors: Leigh Michael Zalusky, Cobb, CA (US); Gregory Lewis Panella, Finley, CA (US)

(73) Assignee: Integrated Hydro Solutions LLC, Kelseyville, CA (US)

( * ) Notice: Subject to any disclaimer, the term of this patent is extended or adjusted under 35 U.S.C. 154(b) by 0 days.

(21) Appl. No.: 17/200,330

(22) Filed: Mar. 12, 2021

Related U.S. Application Data

(60) Provisional application No. 63/061,106, filed on Aug. 4, 2020.

(51) Int. Cl.
*A01G 9/04* (2006.01)
*A01G 9/029* (2018.01)

(52) U.S. Cl.
CPC .......... *A01G 9/0295* (2018.02); *A01G 9/047* (2013.01)

(58) Field of Classification Search
CPC ........ A01G 9/047; A01G 31/00; A01G 31/02; A01G 9/02; A01G 9/10; A01G 9/14
See application file for complete search history.

(56) References Cited

U.S. PATENT DOCUMENTS

| | | | | |
|---|---|---|---|---|
| 2,524,246 | A * | 10/1950 | Young | A01G 9/1423 47/18 |
| 3,842,534 | A * | 10/1974 | Walters | A01G 18/62 47/1.1 |
| 5,409,510 | A * | 4/1995 | Houweling | A01G 31/02 47/62 C |
| 6,182,394 | B1 | 2/2001 | Bassler | |
| 6,601,342 | B2 * | 8/2003 | Dummen | A01G 9/0295 47/62 C |
| 6,955,008 | B2 | 10/2005 | Rose | |
| 8,714,876 | B2 * | 5/2014 | Archipley | A01G 31/02 405/119 |
| 9,226,457 | B2 | 1/2016 | Laurence et al. | |
| 10,624,282 | B2 | 4/2020 | Au | |
| 10,694,682 | B2 | 6/2020 | Bogner et al. | |
| 10,806,099 | B2 | 10/2020 | Bogner et al. | |
| 2014/0202954 | A1 | 7/2014 | Lassovsky | |

(Continued)

FOREIGN PATENT DOCUMENTS

| | | | | |
|---|---|---|---|---|
| AU | 201402160 | B2 | 7/2017 | |
| CA | 2073892 | A1 * | 1/1994 | A01G 31/02 |

(Continued)

OTHER PUBLICATIONS

Pipp Horticulture: Vertical Grow Rack Systems | Indoor Farming; website: https://www.pinterest.com/pin/647885096370787186/; Mar. 28, 2021.

(Continued)

*Primary Examiner* — Kristen C Hayes
(74) *Attorney, Agent, or Firm* — Sidharth Kapoor; Richard J. Brown; Reed Smith LLP

(57) ABSTRACT

A tray system for use in horticultural or agricultural operations comprising a ducting assembly for de-stratification and a drainage system for consolidating excess water and nutrients.

19 Claims, 26 Drawing Sheets

(56) References Cited

U.S. PATENT DOCUMENTS

| | | | |
|---|---|---|---|
| 2015/0282444 A1* | 10/2015 | Butler | A01G 31/02 47/62 C |
| 2018/0042192 A1 | 2/2018 | Volpe et al. | |
| 2019/0230876 A1 | 8/2019 | Lysaa | |
| 2019/0320604 A1 | 10/2019 | Petrovffsky et al. | |
| 2020/0120884 A1 | 4/2020 | Zhan et al. | |
| 2020/0267910 A1 | 8/2020 | Wilson | |
| 2020/0396909 A1 | 12/2020 | Bogner et al. | |

FOREIGN PATENT DOCUMENTS

| | | | |
|---|---|---|---|
| CH | 665529 A5 | 5/1988 | |
| CN | 201192016 Y | 2/2009 | |
| CN | 105935031 A | 9/2016 | |
| CN | 106508648 A | 3/2017 | |
| CN | 109832182 A | 6/2019 | |
| CN | 110731210 A | 1/2020 | |
| CN | 107637499 B | 7/2020 | |
| DE | 19611660 A1 | 10/1997 | |
| DE | 202010012739 U1 * | 12/2011 | A01G 9/028 |
| DE | 202012010529 U1 | 12/2012 | |
| EP | 3192356 A1 * | 7/2017 | A01G 9/047 |
| EP | 3251492 A1 | 12/2017 | |
| GB | 1515831 | 1/1979 | |
| JP | 2009195111 A5 | 7/2010 | |
| JP | 4719327 B2 | 7/2011 | |
| JP | 2020141566 A | 9/2020 | |
| KR | 19990013664 U | 4/1999 | |
| KR | 101238382 B1 | 3/2013 | |
| KR | 20130039842 A | 4/2013 | |
| KR | 101641680 B1 | 7/2016 | |
| WO | 2009122210 A1 | 10/2009 | |
| WO | 2014192331 A1 | 12/2014 | |

OTHER PUBLICATIONS

PCT Invitation to Pay Additional Fees and, Where Applicable, Protest Fee, for PCT/US21/44128, dated Oct. 6, 2021.

* cited by examiner

DUCTING ASSEMBLY FOR DE-STRATIFICATION AND CONSOLIDATING EXCESS WATER AND NUTRIENTS

CROSS-REFERENCE TO RELATED APPLICATIONS

The present application claims priority to U.S. Provisional Application No. 63/061,106, filed Aug. 4, 2020, the disclosure of which is incorporated herein by reference in its entirety.

TECHNOLOGICAL FIELD

This disclosure relates to a tray system for use in horticultural or agricultural operations.

BACKGROUND

Air stratification and excess water/nutrient collection are two problems associated with enclosed vertical agricultural operations. Air stratification can occur when insufficient ventilation is present, and can be especially problematic for the lower levels of racked operations where the canopy of one level of crop tends to prevent the downward circulation of air from vents or fans, which are typically present on the ceiling. Stratification is the layering of air due to density variations caused by temperature, humidity, carbon dioxide depletion etc. and is detrimental to the health of the crops being grown.

Enclosed vertical agricultural operations require that the racking systems provide a method of collecting and consolidating excess water and nutrients draining from the individual growing containers. Fluid that is not consolidated and removed from the operation can foster the growth of mold, fungus and other organisms detrimental to the health of the crops.

Current conventional solutions depend on a combination of technologies to implement drainage and de-stratification using separate trays and combinations of duct work and fans mounted below the growing trays, interfering with the positioning of lighting and potentially decreasing possible vertical density.

SUMMARY OF THE DISCLOSED SUBJECT MATTER

To address the problems in the prior art, a tray system for plant cultivation is provided.

In one aspect, disclosed is tray system for plant cultivation comprising a tray comprising opposed end walls and opposed side walls defining a perimeter of the tray; and a raised region disposed within the perimeter of the tray; a duct assembly comprising one or more air passages having opposed open ends proximate to the end walls of the tray and a plurality of orifices in the one or more air passages to distribute air out of the one or more air passages; wherein the end walls of the tray each comprise an opening configured to provide access to one of the open ends of the duct assembly and the side walls of the tray extend below the raised region to hold the raised region above the duct assembly.

Embodiments of the tray system include any of the following embodiments or any other embodiments disclosed herein, alone or in any combination.

The tray system, wherein the raised region comprises a plurality of ridges disposed between the side walls and parallel to the end walls and a plurality of valleys formed between adjacent ridges of the plurality of ridges wherein the valleys are in fluid communication with a gutter; and optionally a plurality of holes in a subset of the ridges.

The tray system, wherein the plurality of alternating parallel ridges comprise top surfaces defining a level plane for supporting one or more individual growing containers for containing growth medium and plants, and the valleys slope downward from a peak aligned with a center of the tray to a gutter proximate to the perimeter of the upper tray, wherein the valleys are in fluid communication with the gutter for channeling fluid collected in the valleys into the gutter.

The tray system, wherein a set of the plurality of alternating parallel ridges comprises a central boss.

The tray system, wherein the gutter is configured to be in fluid communication with a fluid drainage system.

The tray system wherein the duct assembly comprises a first open end configured to be in fluid communication with a ventilation system and a second open end opposed to the first open end configured to be optionally closed or optionally in fluid communication with a second duct assembly.

The tray system wherein the duct assembly comprises one or more top panels; one or more bottom panels; a first elongate side support member and a second elongate side support member, each configured perpendicularly to the ridges of the tray and engaged to the one or more top panels and the one or more bottom panels; and optionally one or more elongate center support members configured perpendicularly to the ridges of the tray and engaged with the one or more top panels and the one or more bottom panels, wherein the first and second side support members, the one or more top panels, the one or more bottom panels, and the optional one or more center support members define one or more ducts having open ends proximate to the end walls of the tray.

The tray system wherein the duct assembly comprises a plurality of holes in the one or more top panels configured to be in fluid communication with a plurality of holes in raised region of the tray to direct air from the duct assembly to above the tray; or a plurality of holes in the one or more bottom panels configured to direct air from the duct assembly to below the duct assembly; or a plurality of holes in the one or more top panels configured to be in fluid communication with a plurality of holes in raised region of the tray to direct air from the duct assembly to above the tray and a plurality of holes in the one or more bottom panels configured to direct air from the duct assembly to below the duct assembly.

The tray system wherein the duct assembly comprises a plurality of holes in the one or more top panels configured to be in fluid communication with the plurality of holes in raised region of the tray to direct air from the duct assembly to above the tray.

The tray system wherein the duct assembly comprises a plurality of holes in the one or more bottom panels configured to direct air from the duct assembly to below the duct assembly.

The tray system wherein the duct assembly comprises a plurality of holes in the one or more top panels configured to be in fluid communication with the optional holes in the subset of ridges of the tray to direct air from the duct assembly to above the tray and a plurality of holes in the one or more bottom panels configured to direct air from the duct assembly to below the duct assembly.

The tray system further comprising a duct member disposed above the tray comprising a hollow elongate member defining a lumen and a plurality of openings in the hollow elongate member wherein the lumen and the plurality of openings are in fluid communication with the plurality of holes in the raised region of the tray and the plurality of holes in the one or more top panels of the duct assembly to direct air from the duct assembly to above the tray.

The tray system wherein the duct member disposed above the tray is disposed parallel to the end walls of the tray.

The tray system wherein the duct member disposed above the tray is disposed perpendicular to the end walls of the tray.

The tray system wherein the duct assembly comprises a first elongate side support member and a second elongate side support member each extending between the ends of the tray system, each having a cross-section comprising a top section configured to support a bottom surface of the tray below the valleys proximate to the side walls of the tray and engage a top panel of the duct assembly, and a bottom section configured to engage a bottom panel of the duct assembly; and a center elongate support member having a cross-section comprising a top section configured to support a bottom surface of the tray below the valleys proximate to the side walls of the tray and engage a first top panel on a first side and engage a second top panel on a second side and a bottom section configured to engage a first bottom panel on the first side and a second bottom panel; wherein the first elongate side support member, the first side of the center support member, the first top panel and the first bottom panel define a first duct in the duct assembly configured to nest below the valleys of the tray in a first region of the tray between the first side support member, and the center support member and the second elongate side support member, the second side of the center support member, the second top panel and the second bottom panel define a second duct in the duct assembly configured to nest below the valleys of the tray in a second region of the tray between the second side support member and the center support member.

The tray system, wherein the central support member has a cross-section comprising a top section configured to support the bottom of the peak of each of the valleys of the tray, a middle section comprising a bar, and a bottom section configured with a first shelf extending from a first side of the middle bar section, and a second shelf extending from a second side of the middle bar section.

The tray system, wherein the first and second elongate side support members each comprise a top section configured to support the bottom of each of the valleys of the tray proximate to the sides of the tray and a shelf to engage a top panel of the duct assembly, and a bottom section comprising a shelf extending toward the central support member configured to engage a bottom panel of the duct assembly.

The tray system, further comprising a first tray system and a second tray system, wherein ends of the first and second tray system are connected to each other to provide an integrated system of a plurality of tray systems.

The tray system, wherein duct assembly and the tray are configured to rest on a rack system.

The tray system, comprising a tray comprising opposite end walls and opposite side walls; a plurality of ridges extending between the side walls and the end walls; a plurality of valleys formed between adjacent ridges of the plurality of ridges in fluid communication with a gutter; and optionally a plurality of holes in a subset of the ridges; a duct assembly comprising an elongate central support member configured perpendicularly to the ridges extending between the ends of the tray system; a first and a second elongate side support member extending between the ends of the tray system each having a cross-section comprising a top section configured to support a bottom surface of the tray below the valleys; and a first elongate hollow duct member configured to nest below the valleys of the tray in a first region of the tray between the first side support member and the center support member and a second elongate hollow duct member configured to nest below the valleys of the tray in a second region of the upper tray between the second side support member and the center support member, wherein ends of the first and second duct members are configured to fluidly communicate with a ventilation system; top surfaces of the first and second duct members optionally comprise a plurality of orifices in fluid communication with the optional plurality of holes in the subset of ridges of the tray to provide air flow out of the first and second duct members above the tray system; and bottom surfaces of the first and second duct members optionally comprise a plurality of orifices to provide air flow out of the first and second duct members below the tray system.

The tray system wherein the plurality of alternating parallel ridges comprise top surfaces defining a level plane for supporting one or more individual growing containers for containing growth medium and plants, and the valleys slope downward from a peak aligned with center of the tray to a gutter adjacent to the perimeter of the upper tray, wherein the valleys are in fluid communication with the gutter for channeling fluid collected in the valleys into the gutter.

The tray system wherein the central support member has a cross-section comprising a top section configured to support the bottom of the peak of each of the valleys, a middle section comprising a bar, and a bottom section configured with a first shelf extending from a first side of the middle bar section, and a second shelf extending from a second side of the middle bar section.

The tray system wherein the first and second elongate side support members comprise a bottom section comprising a shelf extending toward the central support member.

The tray system wherein the first elongate hollow duct member is supported by the first shelf of the central support member and the shelf of the first side support member, and the second elongate hollow duct member is supported by the second shelf of the central support member and the shelf of the second side support member.

The tray wherein a set of the plurality of alternating parallel ridges comprises a central boss supported by the central support member.

The tray system wherein the gutter is configured to be in fluid communication with a fluid drainage system.

The tray system wherein the first duct member comprises a top panel and a bottom panel, a side comprising a first elongate side member and a side comprising the middle section of the central support member, and the second duct member comprises a top panel and a bottom panel, a side comprising a second elongate side member and a side comprising the second shelf of the central support member.

The tray system wherein the tray comprises a plurality of holes in a subset of the ridges and top surfaces of the first and second duct members comprise a plurality of orifices in fluid communication with the plurality of holes in the subset of the ridges of the tray to provide air flow out of the first and second duct members above the tray system.

The tray system wherein the tray comprises a plurality of holes in a subset of the ridges, the top surfaces of the first and second duct members comprise a plurality of orifices in fluid communication with the plurality of holes in the subset of the ridges of the tray, and the plurality of holes in the subset of the ridges are in fluid communication with a plurality of transverse duct members having a plurality of holes to provide air flow out of the first and second duct members above the tray system.

The tray system wherein bottom surfaces of the first and second duct members comprise a plurality of orifices to provide air flow out of the first and second duct members below the tray system.

The tray system wherein the tray comprises a plurality of holes in a subset of the ridges, top surfaces of the first and second duct members comprise a plurality of orifices in fluid communication with the plurality of holes in the subset of the ridges of the tray, and the plurality of holes in the subset of the ridges are in fluid communication with a plurality of transverse duct members having a plurality of holes to provide air flow out of the first and second duct members above the tray system; and bottom surfaces of the first and second duct members comprise a plurality of orifices to provide air flow out of the first and second duct members below the tray system.

The tray system further comprising: a first tray system and a second tray system, wherein ends of the first and second tray system are connected to each other to provide an integrated system of a plurality of tray systems.

The tray system wherein the central support member and the first and second elongate side support members are configured to rest on a rack system.

The tray system wherein the central support member comprises a t-slot extending the length of the central support member.

The tray system wherein the first and second elongate side support members each comprises a t-slot extending the length of their respective bottoms.

Other aspects include a tray, including any embodiments of a tray described herein.

One embodiment of the tray provides a tray for plant cultivation, comprising opposed end walls and opposed side walls defining a perimeter of the tray, and a raised region disposed within the perimeter of the tray; wherein the side walls of the tray extend below the raised region to hold the raised region above a space defined by the side walls and the raised portion and the end walls of the tray each comprise a cut-out opening configured to provide an opening into the space.

In an embodiment of the tray, the raised region comprises a plurality of ridges disposed between the side walls and parallel to the end walls and top surfaces of the plurality of ridges define a level plane; and a plurality of valleys formed between adjacent ridges of the plurality of ridges, wherein one or more of the plurality of valleys are in fluid communication with a gutter.

Other aspects include a duct assembly, including any embodiments of a duct assembly described herein.

One embodiment of the duct assembly comprises one or more top panels; one or more bottom panels; a first elongate side support member and a second elongate side support member, each engaged to the one or more top panels and the one or more bottom panels; and one or more elongate center support members engaged with the one or more top panels and the one or more bottom panels, wherein the first and second side support members, the one or more top panels, the one or more bottom panels, and the one or more center support members define one or more air passages comprising a first open end configured to be in fluid communication with a ventilation system and a second open end opposed to the first open end configured to optionally be closed or optionally be in fluid communication with a second duct assembly; and a plurality of orifices in the one or more air passages to distribute air out of the one or more air passages.

Embodiments of these inventive concepts, including embodiments of the Summary or any other embodiments described herein, can be combined in any manner, and the descriptions of features in the embodiments pertain not only to the devices of this invention, but also to the methods or uses of any of the devices of the invention.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
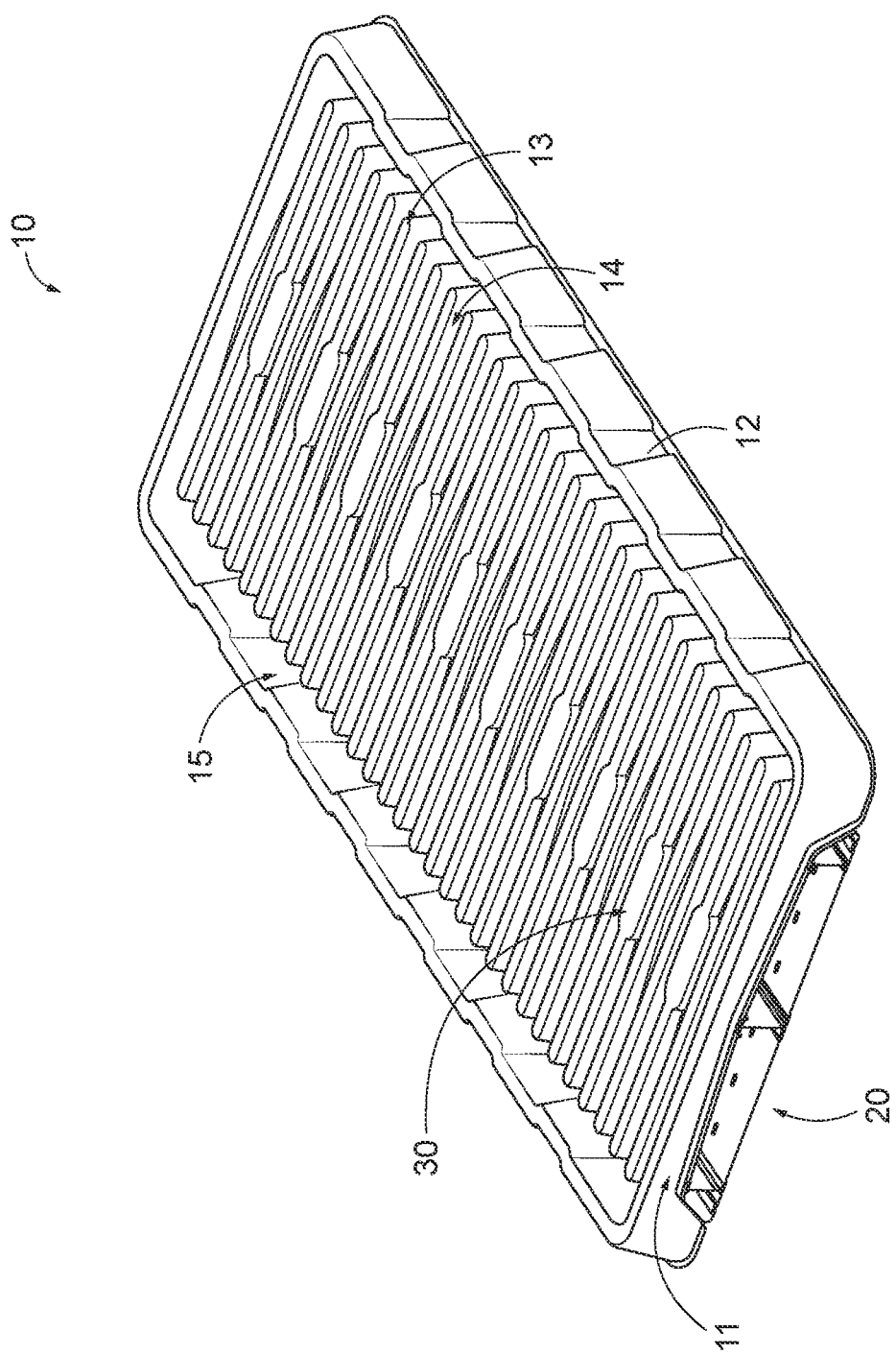
FIG. 1 is a top perspective view of the tray system, according to an embodiment of the disclosed subject matter.

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The inventive concepts consist of a uniquely designed tray system, which may incorporate ductwork for de-stratification entirely within its footprint. The tray system can be constructed from a variety of materials and may include a duct, or a plurality of ducts, that fit within the vertical and horizontal dimensions of the tray and incorporate a plurality of orifices distributed to deliver pressurized gas (typically air, or air enriched with carbon dioxide) above, below or both above and below the tray system, de-stratifying the growing environment of plants resting on the tray. The ductwork can be integral to or nested within the tray assembly.

The design of the tray and ducting assembly allows for efficient circulation and de-stratification of the growing environment while trapping and consolidating excess water and nutrients, providing a level surface for supporting plant containers, and providing a flat lower surface to facilitate the installation of lighting or other hardware. The tray assemblies are modular and designed to optionally attach end-to-end to create a continuous duct of a desired length.

The growing containers with plants therein sit on ridges on the top of the tray, with the duct assembly comprising top and bottom panels, lower panels and blowing orifices beneath the tray. In this way, air flowing through the duct assembly beneath and within the tray directs air upward beneath the leaf canopy of plants on the tray and/or downward to the leaf canopy of plants on another tray system below the tray system. The top surface of the tray is sealed off from the duct assembly and collects water draining from the plants in the gutter(s) on the sides. Notably, no part of the drainage system, including the gutter, the drain or any tubing or piping attached to the drain passes through any part of the duct assembly.

As shown in FIG. 1 (see also FIGS. 7 and 10), the tray system comprises a tray 10 comprising two open ends 11 and two sides 12, and comprising a plurality of alternating parallel ridges 13 and valleys 14 parallel to the two ends 11, forming a corrugated region having a top surface and a bottom surface. The walls of the open ends 11 of the tray 10 are configured to provide a space for the duct assembly 20 to nest into and below the bottom surface of the tray 10 below the valleys 14. The sides 12 of tray 10 extend below the region of alternating ridges 13 and valleys 14 so that tray 10 rests above duct assembly 20. The bottom of the perimeter of the tray proximate to the sides 12 and corners of the tray 10 may be generally flat, so that it can support the tray 10 when rested on a surface such as a shelf or horizontal support members of a racking system (not shown, see FIG. 21).

The ridges being parallel to the ends of the tray is not limiting. In other embodiments, the ridges may be parallel to the sides of the tray. In other embodiments, the ridges may be diagonal relative to the sides and ends of the tray. Other embodiments of the tray do not require the ridges to be parallel to one another. In their broadest sense, the ridges define a generally level surface on which plant containers can rest on, and the valleys between the ridges generally slope downward from one or more high points to a gutter having a drainage hole at the lowest point of the tray to collect and drain water from the tray.

Notably the plurality of alternating parallel ridges 13 comprise top surfaces defining a level plane for supporting one or more individual growing containers for containing growth medium and plants, and the valleys slope 14 downward from a peak, such as aligned with center of the tray as shown, to gutter(s) 15 proximate to the side(s) 12 of the tray 10, wherein the valleys 14 are in fluid communication with the gutter 15 for channeling fluid collected in the valleys 14 into the gutter 15. Fluid collected in the valleys 14 comprises excess (run-off) water and nutrients supplied to plants by drenching, flooding, drip irrigating or misting operations described further below.

For example, water may be delivered through polyvinyl chloride (PVC) or polyethylene tubing that can be affixed to sides of a rack system described below and then delivered to each plant using a manifold system and smaller diameter tubing with drip nozzles.

The parallel ridges 13 are designed to support a plurality of individual growing containers, for example, plastic or clay pots, while allowing fluid to drain, such as from the containers, into the valleys 14 and the gutter 15 without pooling. Preferably, the ridges 13 have a generally flat top surface to provide a level surface for the growing containers.

The spacing between ridges 13 is configured to support growing containers having dimensions ranging from about 2 to about 8 inches (about 4 cm to about 20 cm), such as 6-inch (15-cm) square containers. Containers may be round, square, rectangular, hexagonal, octagonal, etc. Smaller containers would yield higher plant densities. Seeds may be sprouted into seedlings and grown using trays with a plurality of molded-in receptacles until they are large enough to be transplanted into larger containers. Plants are typically spaced at one container per square foot, such as thirty-two plants on a standard 4 foot by 8 foot (about 1.2 meters by 2.4 meters) tray. Other tray sizes would scale by this value.

The top surface of the tray 10 in the valleys 14 may slope downwards from the center of the tray toward the sides of the tray. This slope is designed to drain fluid towards the gutter at the edges of the tray where it is consolidated and drained, for example by means of attached tubing or piping as described below. The alternating ridges 13 and valleys 14 also stiffen the tray surface and transfer loads from the growing containers on the tray to the side and central support members of the duct assembly 20 described further below.

Preferably, the tray 10 comprises a thin cross-section comprising a corrugated region of the alternating ridges 13 and valleys 14 so as to allow efficient molding using a vacuum or pressure process, wherein the tray 10 has a shape configured to nest above and around the duct assembly 20. The tray is designed to be molded from a variety of polymers or layers of polymers such as acrylonitrile butadiene styrene (ABS), polyvinyl chloride (PVC), acrylonitrile styrene acrylate (ASA), etc. or combinations thereof. In some embodiments, the tray may have antimicrobial properties in order to maintain a relatively sterile growing environment. Additives in the polymer used in the manufacture of the tray 10 may provide improved antimicrobial properties. Some materials appropriate to the construction of the tray (ABS, PVC, etc.) may have inherent antimicrobial properties. Alternatively, the surface of the tray may comprise a coating with antimicrobial properties, applied either before or after molding or forming the tray 10.

The design of the tray 10 incorporates the necessary draft angles on all surfaces to allow for release from the mold. While the tray 10 is most efficiently made from molded polymer, it would also be possible to fabricate it from a variety of materials such as stainless steel, aluminum, glass or composites such as fiberglass, etc.

Figure 2:
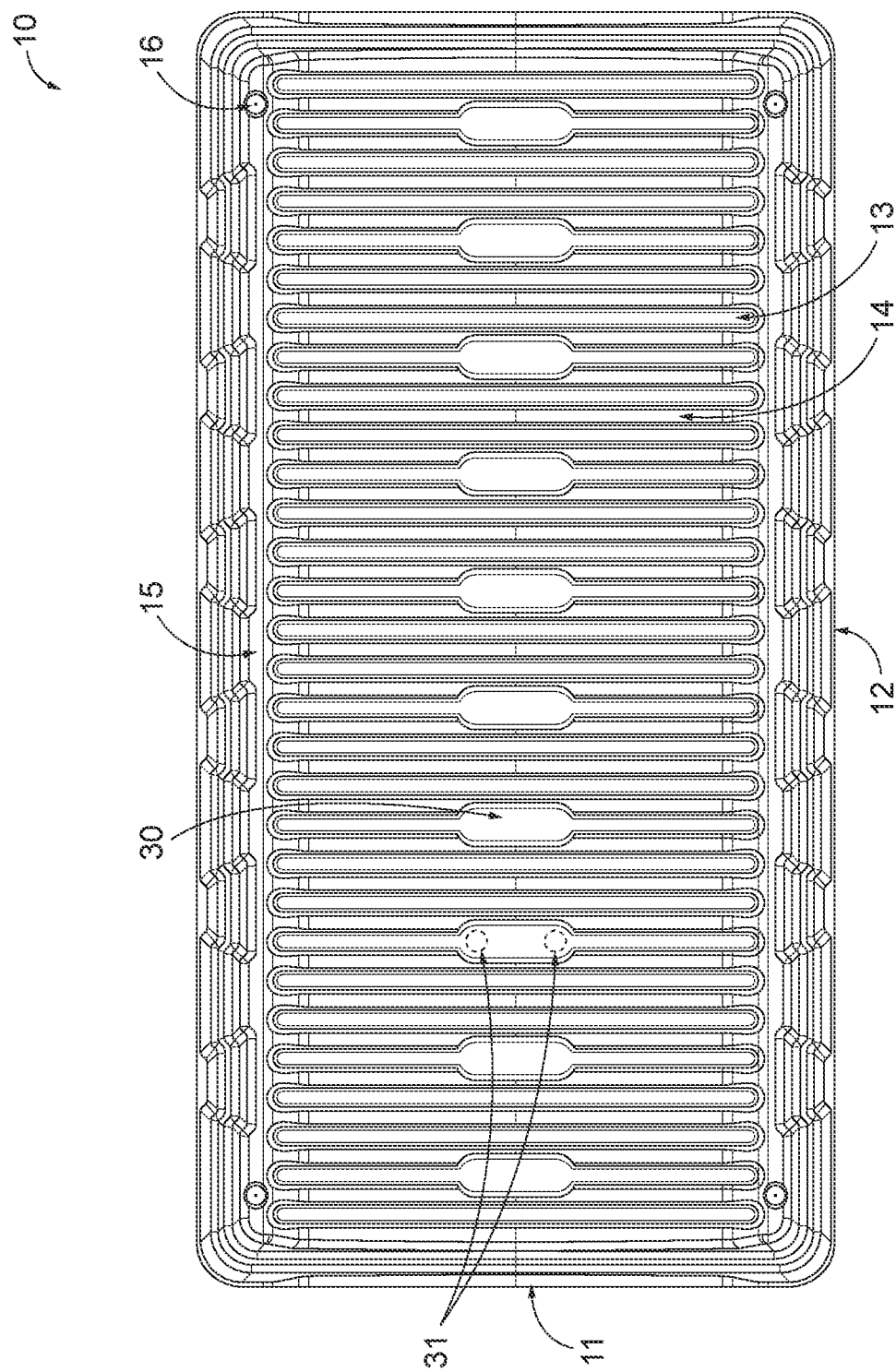
FIG. 2 is a plan view of a tray of the tray system, according to an embodiment of the disclosed subject matter.
Figure 3:
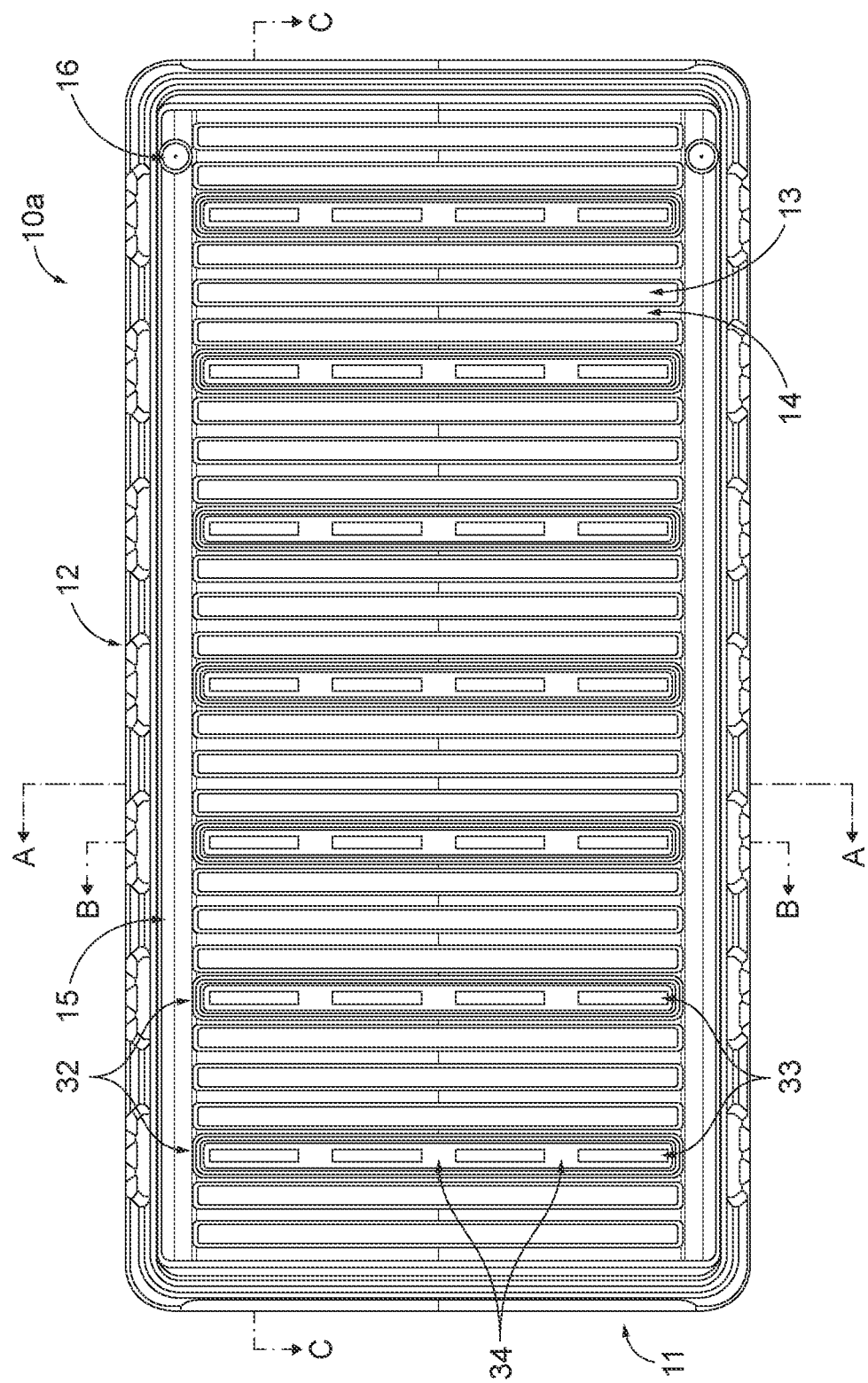
FIG. 3 is a plan view of an alternate tray of the tray system, according to an embodiment of the disclosed subject matter.

As seen in FIGS. 2 and 3, the tray 10 has one or more drainage bosses 16 in the bottom of the gutter 15. The drainage of excess water or liquid nutrients is accomplished by the angled slope of the valleys 14 and gutter(s) 15 incorporated into the tray. The drainage bosses 16 in the tray gutters may allow connection of fittings to tubes or pipes to drain away the consolidated water and nutrients.

In the embodiment illustrated in FIG. 2, the tray 10 has four drainage bosses 16, one in each corner of the tray 10, but not all need to be functional as drains. In the embodiment illustrated in FIG. 3, the tray 10a has two drainage bosses 16, one in each gutter 15 proximate to each side 14 of the tray 10a. As shown in FIGS. 2 and 3, the drainage bosses 16 are circular but that is not limiting. Other shapes such as oval, square, rectangular or slit may also be envisioned. The drainage bosses 16 may comprise a region of thicker molding to strengthen the tray and a center that can be punched out to provide an opening or drainage hole for fluid to drain out of the gutter 15 into a drainage system. Alternatively, the tray may be molded with one or more opening(s) already present in the drainage bosses 16. In some embodiments, the drainage hole is simply an opening to allow fluid to pass through to drain water into a gutter or drain pipe in the rack system. In other embodiments, the drainage boss may be configured to be attached to the drainage system such as by a fitment, e.g. a gasket, flanged insert or barbed or threaded bulkhead fitting, to allow connection of pipe or tube fittings to drain away the consolidated water and nutrients. In other embodiments, the tray may have a molded-in nipple which protrudes below the surface of the upper tray and allows the attachment of a barbed or threaded pipe fitting using either a mechanical or solvent welded connection. In embodiments, one or more drainage bosses 16 are located in the side gutters 15 and positioned such that water flowing along the gutter 15 drains into the boss 16 and attached piping. The drain opening to drainage boss 16 may include a polymer or metal mesh or slotted filter to prevent ingress of debris into the drainage system.

Tubing or piping attached to the drainage bosses 16 of one tray system may be run into a drainage gutter of another tray system on a lower tier of a rack system, or in the case of the bottom tier or alternate implementation directly into a main drainage line on the bottom of the rack system. This main drainage line may be sloped down to a building floor drain.

In some embodiments, the excess water can be collected and sent to a recycle system for later reuse. Recycling the excess water can further comprise filtering, disinfecting (or other purification method) and/or replenishing nutrients.

Preferably the tray 10 has dimensions to allow a user to conveniently lift and transport a tray and possibly growing containers resting thereon. Tray sizes may be configured depending on the type and size of plants to be grown using the tray system and the growing rooms available to a user of the tray system. In some embodiments, the tray 10 may have about 12 inches (about 0.3 meter), about 18 inches (about 0.45 meter), about 24 inches (about 0.6 meter), about 3 feet (about 0.9 meter) or about four feet (1.2 meter) or wider. In some embodiments, the tray 10 may have lengths of about 3 feet (about 0.9 meter), about four feet (1.2 meter), about 6 feet (about 1.8 meter), about 8 feet (about 2.4 meter) long, about 10 feet (about 3 meters) or about 12 feet (about 3.7 meters). In some embodiments, the tray may have a height of about 2 inches to about 12 inches (about 5 cm to about 30 cm), preferably about 4 inches to about 6 inches (about 10 cm to about 15 cm), such as about 5 inches (about 13 cm).

In embodiments, tray dimensions may include 2 feet by 4 feet (about 0.6×1.2 meter), 4 feet by 4 feet (about 1.2×1.2 meter) 4 feet by 8 feet (about 1.2×2.4 meter), 4 feet by 10 feet (about 1.2×3 meter) and 4 feet by 12 feet (about 1.2×3.7 meter). As described below, tray systems may be connected end-to end to provide longer continuous runs.

As shown in FIG. 2, a subset of the ridges 13 may comprise intermittent flats on the upper surface of the tray to provide blowing bosses 30 centered on the tray 10. As illustrated, the flats of the blowing bosses 30 are configured as rounded rectangles, but that is not limiting. The blowing bosses 30 are designed to allow access to a duct or ducts of the duct assembly 20 for the purpose of distributing air above the tray surface to the underside of the crop canopy from below if desired. In this embodiment, a cut or a plurality of cuts may be made in blowing bosses 30 to provide a plurality of openings 31 in the tray in fluid communication with a plurality of openings in a top surface of a duct, as described below, to provide air flow out of the ducts to above the tray system. In the exemplary embodiment shown in FIG. 2, optionally, a circular cut (shown as a dotted circle) could be made on each end of a flat blowing boss 30, concentric with the rounded ends of the blowing boss 30 to allow each opening 31 to be in fluid communication with a duct in the duct assembly 20.

In FIG. 3, a subset of the ridges 13 may comprise intermittent flats on the upper surface of the tray to provide blowing bosses 32 extending across the corrugated region on the tray 10*a*. In this embodiment, a plurality of openings can be made in blowing bosses 32 to provide a plurality of slots 33 separated by spacers 34 in the tray 10*a*, wherein the slots 33 are in fluid communication with a plurality of openings in a top surface of a duct, as described below, to provide air flow out of the ducts to above the tray system.

The number and location of the plurality of blowing bosses 30 or 32 and openings 31 or 33 is not limiting, but may be dependent on the size and quantity of growing containers to be placed on the tray, the size of the plants therein, and the environmental conditions desired. When not used to distribute air above the tray system, openings 31 or 33 can be sealed with correspondingly-shaped plugs to close the openings.

Figure 4:
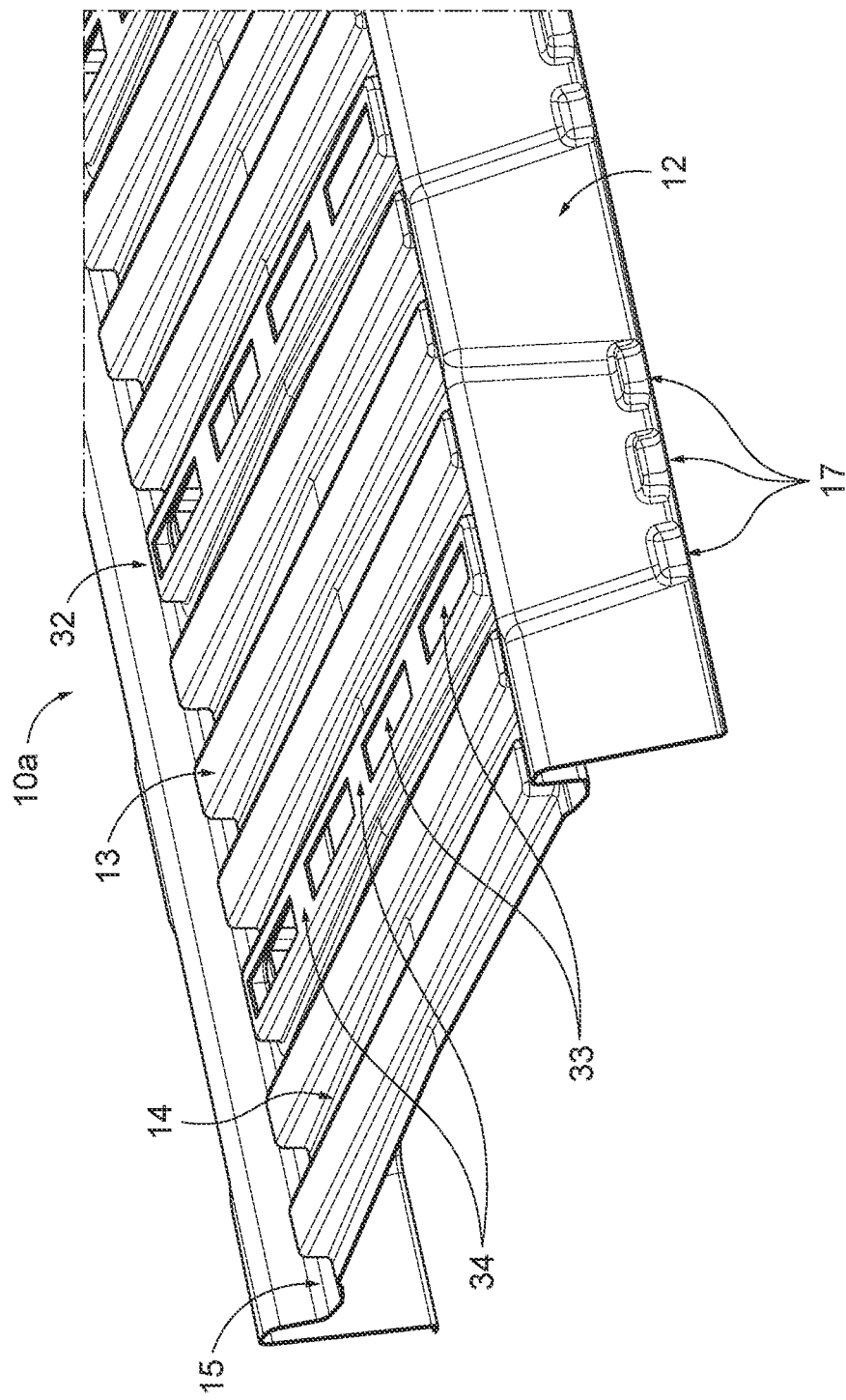
FIG. 4 is a perspective view of a cross section of the tray shown in FIG. 3, according to an embodiment of the disclosed subject matter.

FIG. 4 is a perspective view of a cross section of the tray 10 along line A shown in FIG. 3, according to an embodiment of the disclosed subject matter. The slope of the valleys 14 from the high point at the center of the tray 10*a* to the junction of the valley 14 and the gutter 15 is shown, and can be about 1 to 3 degrees down from horizontal. FIG. 4 also shows optional stacking lugs 17 formed in the sides 12 of the tray 10*a*.

In other embodiments the valleys 14 may slope from a first side of tray 10 to the opposed second side to a single gutter 15 proximate to the second side in fluid communication with the valleys 14 to collect fluid from the top of tray 10. In these embodiments, the duct assembly 20 would have a cross-section complementary to the slope of the valleys 14 wherein the top of duct assembly 20 has a slope equivalent to the slope of valleys 14.

In other embodiments the valleys 14 may slope down from a first side of tray 10 and a second side of tray 10 to a single gutter 15 proximate to the central region of the raised portion of the tray in fluid communication with the valleys 14 to collect fluid from the top of tray 10. In these embodiments, the duct assembly 20 would have a cross-section complementary to the slope of the valleys 14 wherein the top of duct assembly 20 has a slope equivalent to the slope of valleys 14.

Figure 5:
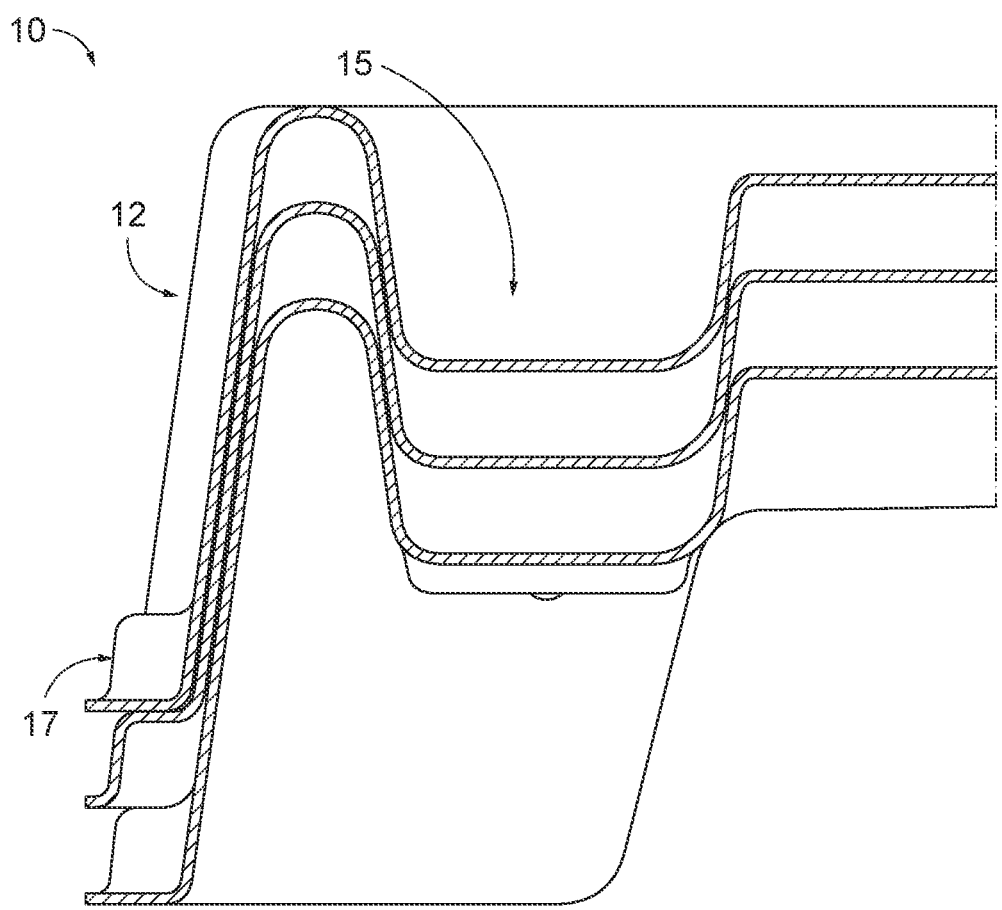
FIG. 5 shows a close-up end view of a stack of trays of the tray system, according to an embodiment of the disclosed subject matter.

FIG. 5 shows a close-up end view of a stack of trays 10 of the tray system. The trays 10 can nest together for shipping and/or storage, in which the optional stacking lugs 17 on each tray separate the trays so that the trays can be easily unstacked. For example, the stacking lugs 17 can be sized to separate the trays with a separation of about 0.66 inch (about 1.7 cm) between each tray. This number would be tailored to the material thickness and draft angles present on the molded tray surfaces to ensure a minimum separation distance of around 0.030 inch at all points between the trays.

In some embodiments, a tray 10 as described herein can be used without being engaged to or nested above a duct assembly 20. For example, a tray 10 can be used to carry plants from one location to another in a growing operation without the duct assembly 20. In another example, a tray 10 can be used in a single-tier growing space or when plants are small, wherein air distribution within the growing environment does not need to be directed out of a duct assembly 20.

In some embodiments, the tray may comprise one open end and one closed end such that the closed end does not provide an opening configured to provide access to the duct assembly. In other embodiments, the tray may comprise two closed ends.

In embodiments, the duct assembly 20 nests within or below the tray 10. In the embodiments shown in FIG. 1, the duct assembly 20 is nested within and below the tray 10 and is a separate assembly.

Figure 6:
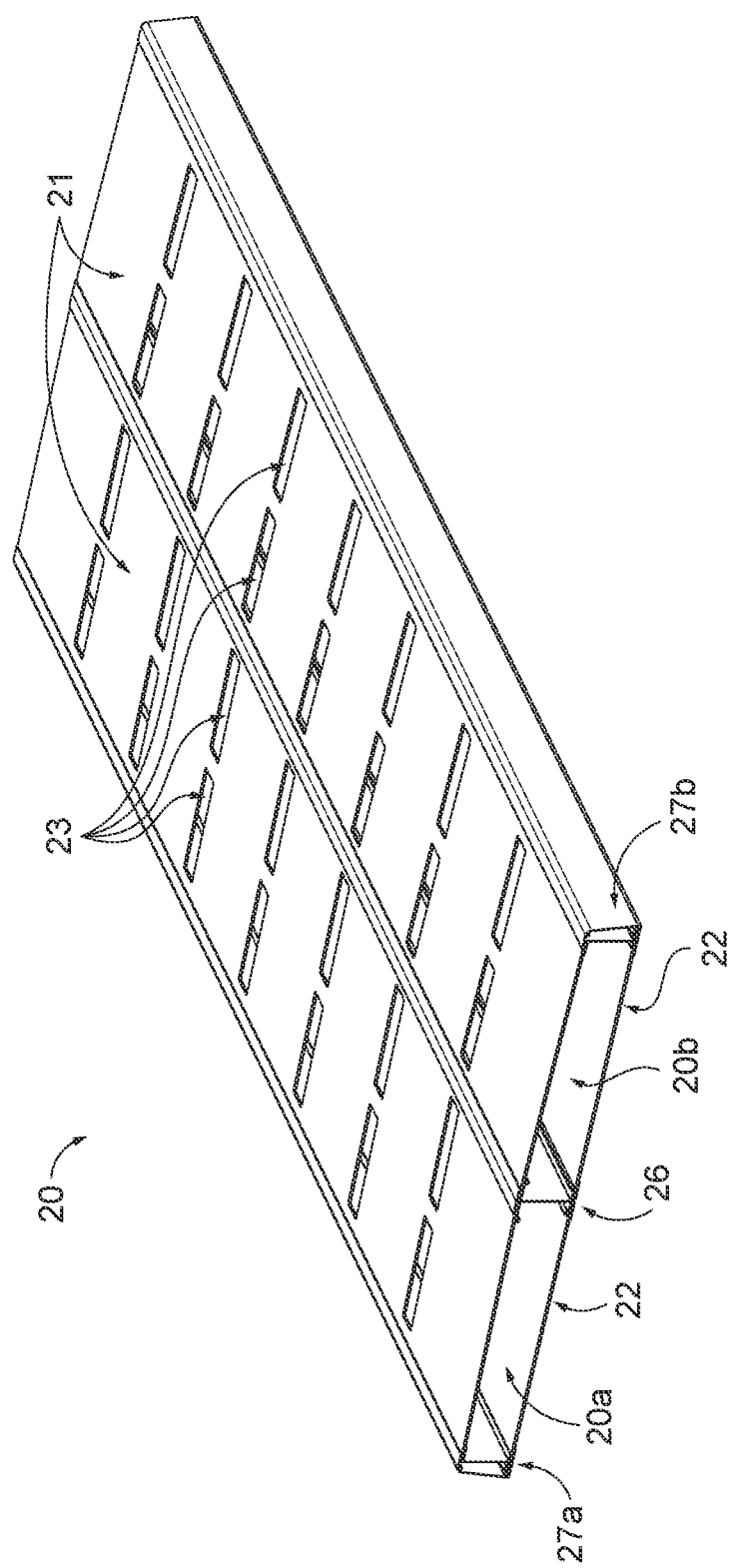
FIG. 6 is a top perspective view of a duct assembly of the tray system, according to an embodiment of the disclosed subject matter.

FIG. 6 shows a top perspective view of an exemplary embodiment of the duct assembly 20 with tray 10 removed. The duct assembly is designed to nest within the tray system under the tray 10, necessitating that the upper surfaces of the duct assembly 20 be angled to accommodate the draining feature of valleys 14 of the tray 10, which are sloped to collect and concentrate the excess water and nutrients. In the embodiment shown, the cross-section of the two ducts 20*a* and 20*b* of the duct assembly 20 may generally be trapezoidal with a flat bottom and sides and an angled top. Typically, the ducting 20 will be laid down first with the tray 10 positioned (resting) on top. As described elsewhere herein, the duct assembly can also be used by itself, with no tray, and positioned above the top tier of trays to provide downward airflow and lighting mounting points.

Preferably, the fit is snug and contact is required between the duct assembly 20, including center support member 26 and side support members 27*a*, 27*b*, and tray 10 in order to transfer load from the weight of plant containers on the upper surface of the tray 10 to a supporting rack system. Notably, the tray 10 and duct 20 are not permanently attached or sealed together to facilitate switching upper trays 10 while leaving the duct assembly 20 in place on the rack system.

In the embodiment shown in FIG. 6, the duct assembly 20 is constructed of flat top panels 21 that form the top of the duct assembly 20, flat bottom panels 22 that form the bottom of the duct assembly 20, a center support member 26 and side support members 27*a* and 27*b*. Flat panels 21 and 22 may be made from polymer, composite or metal. Preferably the duct assembly panels can be made of plastics such as PVC, ABS, ASA, polycarbonate, polyethylene, etc. Notably, expanded PVC can be used due to its low cost and stiffness. FIG. 6 shows that the top panels 21 may optionally comprise holes that are in fluid communication with optional holes 31 or 33 in the tray 10 or 10*a* to provide air flow above the tray system. In the embodiment shown, the holes 23 in the top panels 21 are aligned with corresponding slots 33 in tray 10*a*. In other embodiments (not shown), the holes in top panels 21 are aligned with corresponding holes 31 in tray 10. In still other embodiments (not shown), the top panels 21 do not have holes and air would not be delivered above the tray system.

Figure 21:
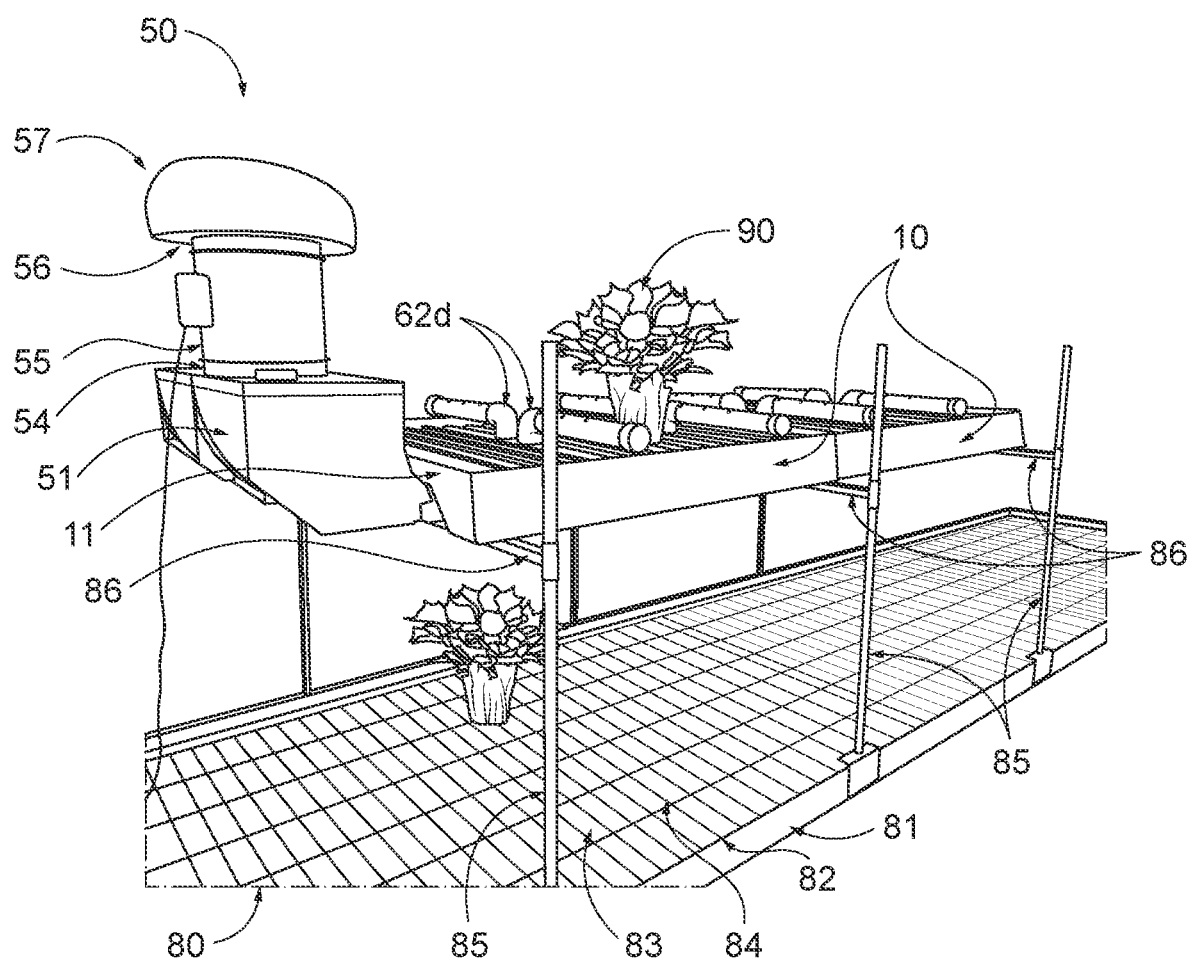
FIG. 21 depicts a view of a plurality of the tray systems connected end-to-end on a rack system, according to an embodiment of the disclosed subject matter.

The function of the center and side support members 26, 27*a* and 27*b* is to provide connectors for the top and bottom panels 21 and 22, as well as to serve as a load path from the underside of the upper tray 10 to perpendicular horizontal support members on a rack system such as shown in FIG. 21.

In the embodiment illustrated in the Figures, the edges of the top and bottom duct panels 21 and 22 are attached to the center 26 and side support members 27*a* and 27*b* by insertion into slots at the top and bottom of the center and side support members.

To provide adequate support for the upper tray and plant containers, the support members are typically fabricated from a variety of materials such as stainless steel, aluminum, alloys or carbon composites, etc. Notably, the support members are configured to be elongate with a consistent cross-section along their length, allowing for their fabrication as extrusions. Preferably, the center and side support members are aluminum extrusions. The extrusions that form the center and side support members form the primary load path to horizontal support members on a rack system, allowing the material (e.g. panels 21 and 22) making up the bulk of the air ducts to be non-structural.

The top panels 21 and bottom panels 22 are releasably engaged with the support members 26, 27a and 27b so that the duct assembly can be disassembled to interchange top panels 21 and/or bottom panels 22 to modify the air distribution out of the ducts 20a and 20b to direct air above the tray system, below the tray system or both above and below the tray system. Disassembly also allows for easy cleaning and/or compact storage of the components of the duct assembly 20.

Figure 7A:
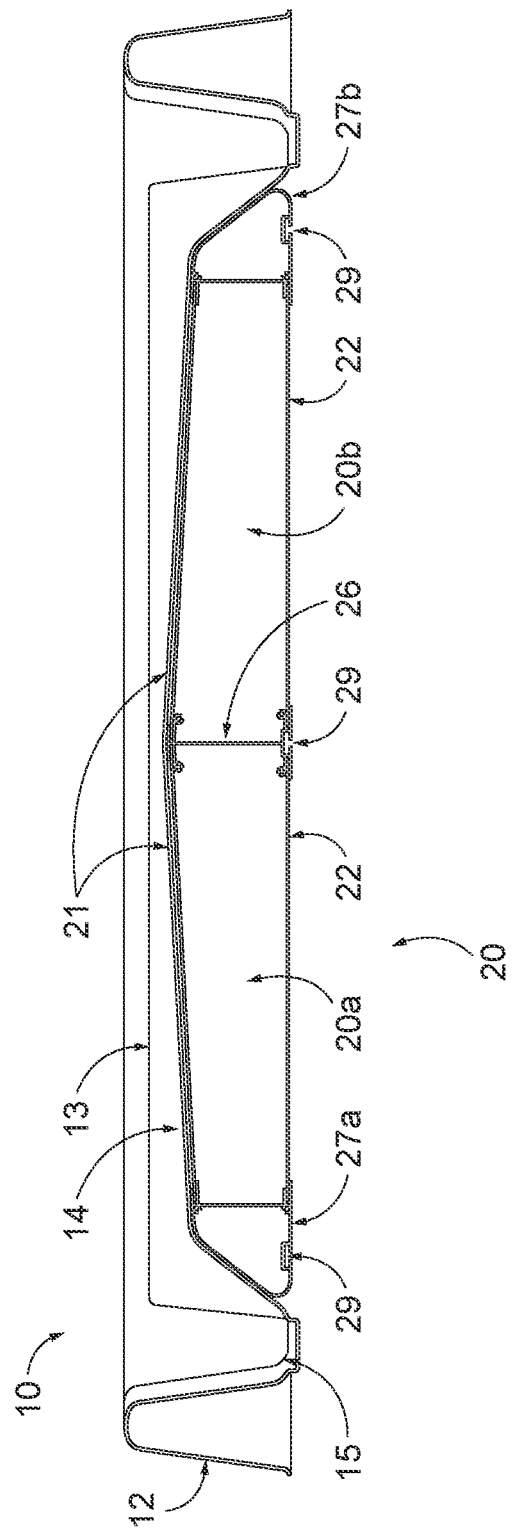
FIG. 7A is an end view of the tray system, according to an embodiment of the disclosed subject matter.
Figure 7B:
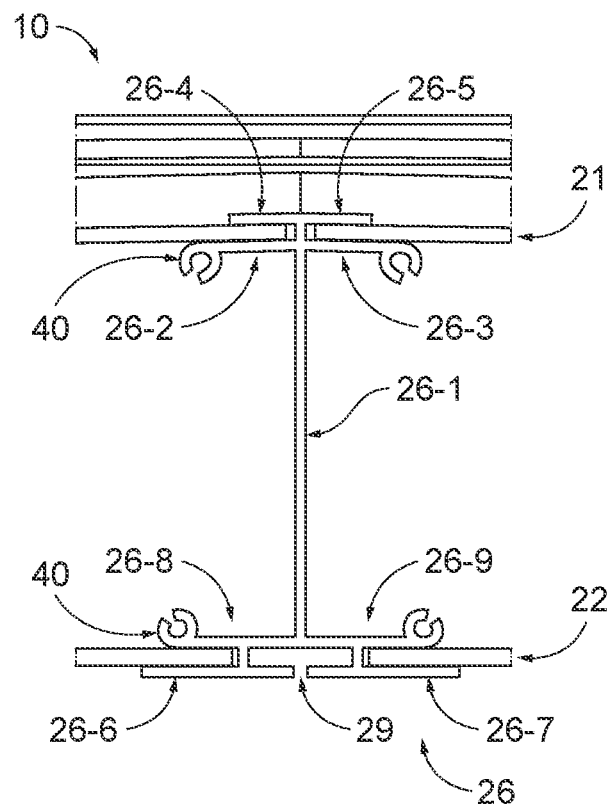
FIGS. 7B and 7C shows close-up end views of the side and center support members of the tray system respectively, according to an embodiment of the disclosed subject matter.
Figure 7C:
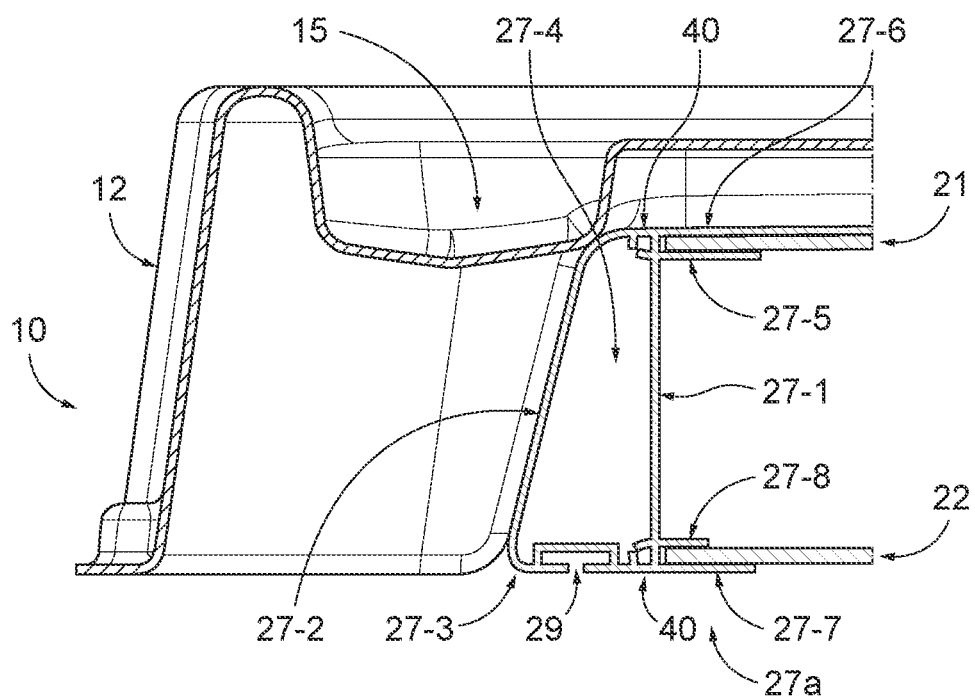

FIG. 7A shows a cross-section of an embodiment of the tray system, such as along line A shown in FIG. 3, and FIG. 7B shows enlarged cross-sections of center support member 26 and side support member 27a. One can appreciate that side support member 27b comprises the same cross-section as 27a, except that the cross-section is flipped horizontally. As shown in FIG. 7A, tray 10 rests on top of support members 26, 27a and 27b and over duct assembly 20. Duct assembly 20 is visible through the open ends 11 of tray 12.

In the embodiment shown in FIG. 7B, the central support member 26 has a cross-section comprising (i) a top section configured to support the bottom of the peak of each of the valleys 14 and connect to the top duct panels 21, (ii) a middle section comprising a bar 26-1, and (iii) a bottom section configured with a first shelf 26-extending from a first side of the middle bar section, and a second shelf extending from a second side of the middle bar section. The top section comprises a first upper shelf 26-2 extending from one side of bar 26-1 and a second upper shelf 26-3 extending from the opposed side of bar 26-1. The top section also comprises a first upper flange 26-4 extending from one side of bar 26-1 and a second upper flange 26-5 extending from the opposed side of bar 26-1. First upper shelf 26-2 and first upper flange 26-4 form a slot that engages a first top panel 21. Second upper shelf 26-3 and second upper flange 26-5 form a slot that engages a second top panel 21. Preferably the shelf is longer than the flange to create a surface to rest the panel on before seating the entire length in the slot. This greatly eases assembly.

The bottom section comprises a first lower shelf 26-6 extending from one side of bar 26-1 and a second lower shelf 26-7 extending from the opposed side of bar 26-1. The bottom section also comprises a first lower flange 26-8 extending from one side of bar 26-1 and a second lower flange 26-9 extending from the opposed side of bar 26-1. First lower shelf 26-6 and first lower flange 26-8 form a slot that engages a first bottom panel 22. Second lower shelf 26-7 and second lower flange 26-9 form a slot that engages a second bottom panel 22.

In an alternative embodiment of center support member 26, bar 26-1 may be replaced by two bars, one bar connecting the ends of first upper shelf 26-2 and first lower flange 26-8 and a second bar connecting the ends of second upper shelf 26-3 and second lower flange 26-9. In this embodiment, the two bars may provide extra vertical support to the tray 10, and in combination with the upper shelves and the lower flanges, define a lumen in center support member 26.

In the embodiment shown in FIG. 7B, the first and second elongate side support members 27a and 27b each comprise a generally triangular or trapezoidal cross-section comprising (i) a top section configured to support the bottom of each of the valleys 14 proximate to their junction with gutter 15 and connect to the top duct panels 21, (ii) a middle lumen section, and (iii) a bottom section 27-3 configured to connect with a bottom duct panel 22. The top section comprises an upper shelf 27-5 extending from one side of bar 27-1. The top section also comprises an upper flange 27-6 extending from the side of bar 27-1. Upper shelf 27-5 and upper flange 27-6 form a slot that engages a top panel 21.

First bar 27-1 is configured to be vertical and bounds one side of the ducts 20a or 20b opposite the side bounded by the bar 26-1 of the center support member 26. Second bar 27-2 may be configured to join the top section and the bottom section and is configured to support the tray 10 proximate to the region of the gutter 15. A shown, second bar 27-2 is configured to be sloped and curve toward the top and bottom sections, but that is not limiting. The middle section comprises a lumen 27-4 bounded by a first bar 27-1, second bar 27-2 and the bottom section.

The bottom section comprises a lower shelf 27-7 and a lower flange 27-8 above lower shelf 27-7, each extending from one side of bar 27-1 toward the center of the tray system. Lower shelf 27-7 and lower flange 27-8 form a slot that engages a bottom panel 22.

Optionally, as shown in FIGS. 7A and 7B, the support members 26, 27a and 27b may also incorporate a feature (in the embodiments shown a "t-slot") 29 along the bottom surface to allow the installation of hooks or fittings to hold lighting and/or other equipment. Embodiments include those wherein the central support member 26 comprises a t-slot extending the length of the central support member. Embodiments include those wherein the first and second elongate side support members 27a and 27b each comprises a t-slot extending the length of their respective bottoms. The t-slots 29 can also serve as a fastening feature between duct sections as discussed further below with the use of a connector which fits within the slot and bears between the inside of the slot and the top on each support member section. The t-slots 29 may also be used to attach the duct assembly 20 to horizontal support members on a rack system.

Optionally, as shown in FIGS. 7A and 7B, the support members 26, 27a and 27b may each also comprise one or more small lumens, depicted as open circles 40. Lumens 40 can also serve as a fastening feature between duct sections as discussed further below with the use of a connector configured to fit within the lumens 40 and extend into the insides of lumens 40 on tray systems laid end-to-end. These may be used as alignment features with a pin spanning the two extrusion sections and precisely aligning the extrusions so that the t-slot clamp does not need to index the extrusions, only provide the mechanical fastening function.

As described above, alternative embodiments comprise valleys 14 sloping from a first side of tray 10 to the opposed second side to a single gutter 15. In these embodiments, side support members 27a and 27b would not have the same cross-section, wherein one side support member would be taller than the other and a top section sloping downward and the other would have a top section sloping upward. The center support member 26 would have top section that comprises a single sloped top. In other such embodiments, the center support member 26 may be eliminated and a single top panel 21 and a single bottom panel 22 are engaged to side support members 27a and 27b to provide a single duct in duct assembly 20.

In other embodiments the valleys 14 may slope down from a first side of tray 10 and a second side of tray 10 to a single gutter 15 proximate to the central region of the raised portion of the tray in fluid communication with the valleys 14 to collect fluid from the top of tray 10. In these embodiments, the duct assembly 20, the side support members would be taller than the center support member and would have a top section that slopes downward to the center of the duct assembly, and the center support member would have a top section wherein sides of the slope upward toward the sides of the duct assembly.

Lumens in side support members 27a and 27b, and a lumen in an alternative embodiment of center support member 26 described above may be used as conduits to conduct fluid such as water or nutrient solutions to an irrigation system, or contain other components such as electrical wiring. For example, lumens in side support members 27a and 27b may contain wires to supply power to lights mounted in t-slots 26 (see FIG. 9) and a lumen in center support member may conduct water to an irrigation system.

Figure 8:
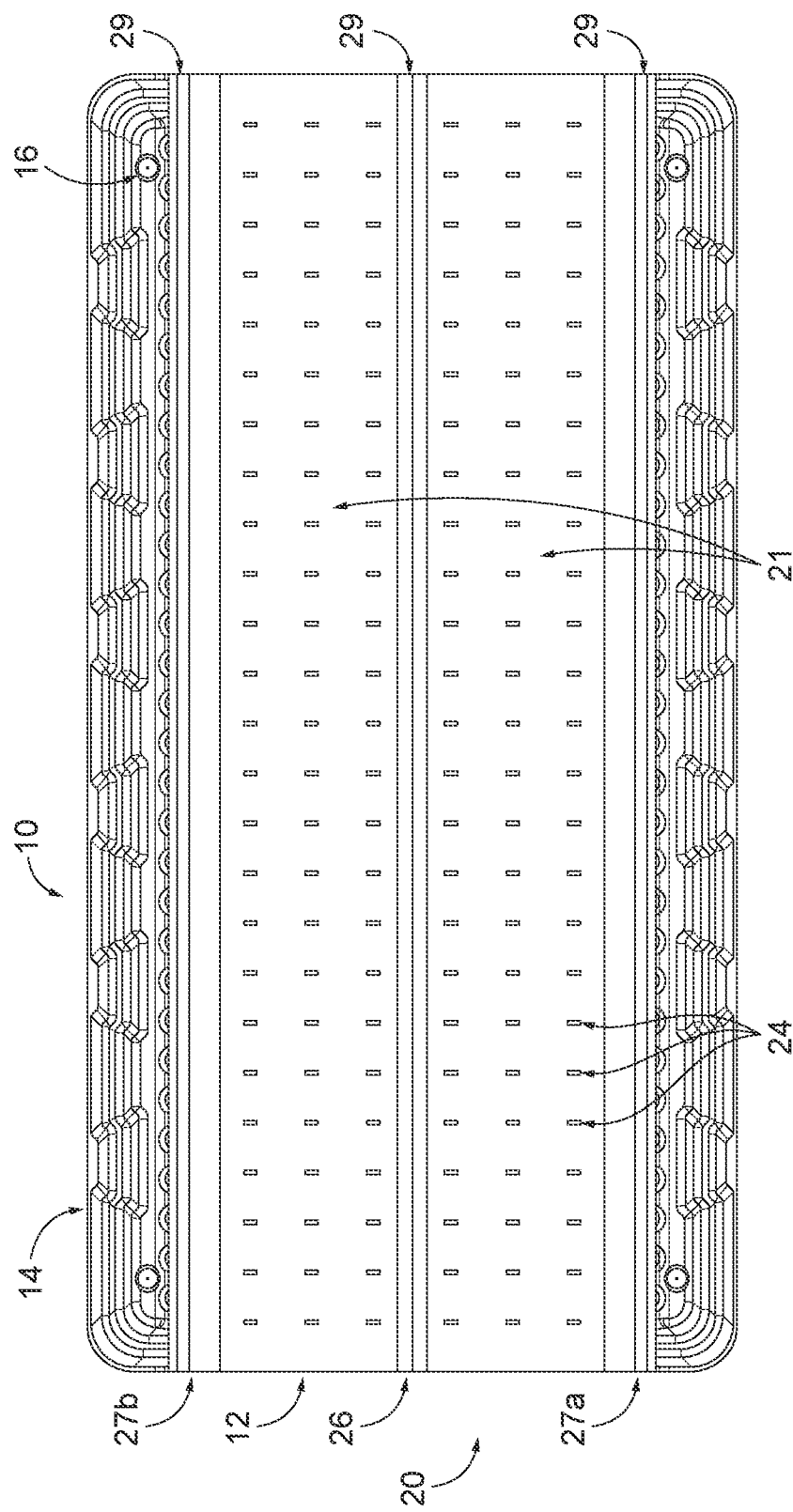
FIG. 8 is a plan view of the bottom of the tray system, according to an embodiment of the disclosed subject matter.
Figure 9:
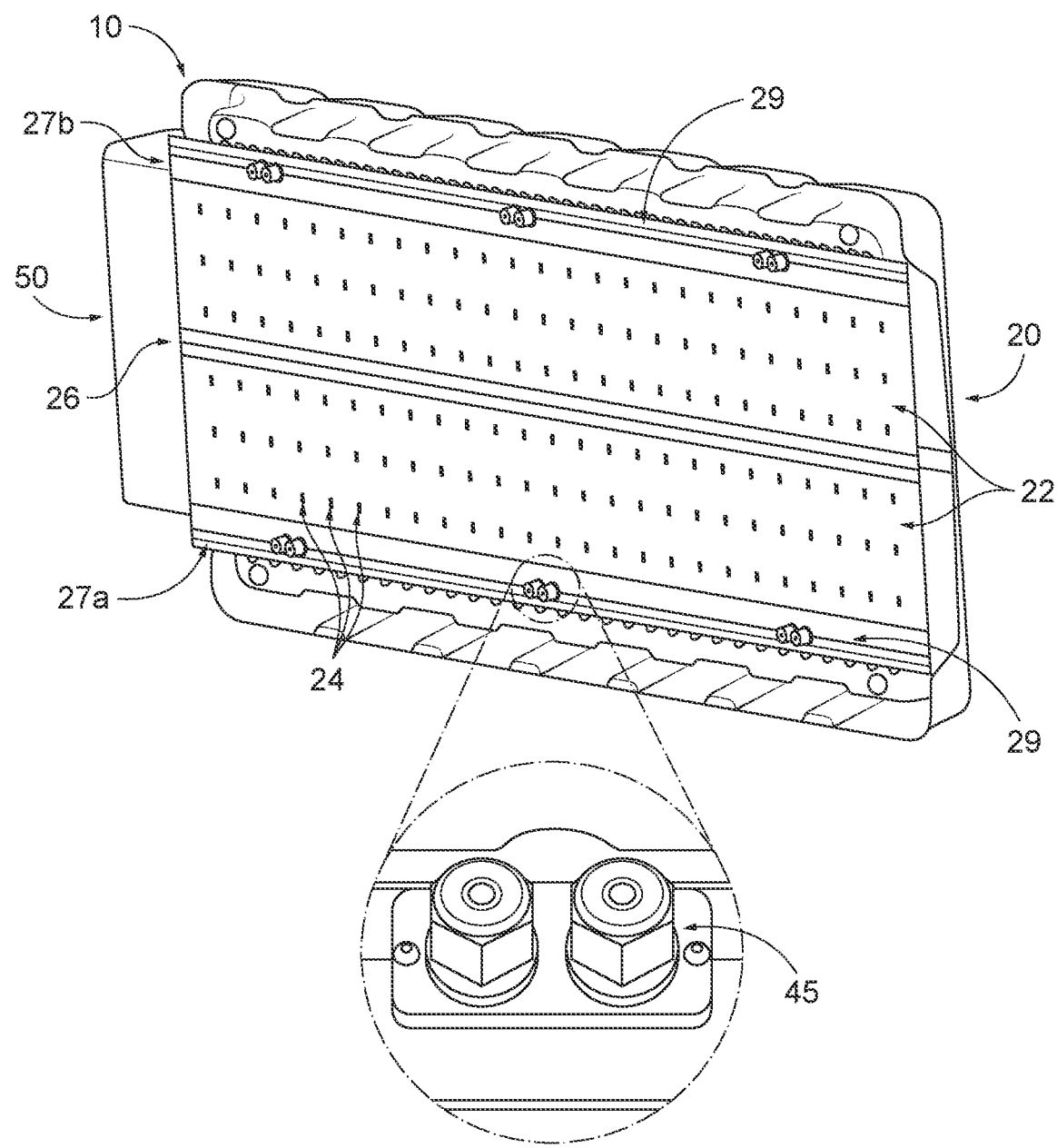
FIG. 9 is a perspective view of the bottom of the tray system, according to an embodiment of the disclosed subject matter.

As shown in FIGS. 8 and 9, in some embodiments the bottoms of the ducts 20a and 20b may comprise a plurality of orifices 24 in the bottom panels 22 to allow air to be distributed from a ventilation system through the ducts and onto plants below the tray system in a vertical growing system. The orifices may be round, oval shaped, rectangular, slotted etc. In other embodiments the bottom panels 22 do not comprise orifices 24 and air cannot exit from the bottom of ducts 20a and 20b. The distribution of orifices 24 in bottom panels 22 may be based on the desired flow capacity of the blowing system.

FIG. 9 shows LED lights 45 shown attached to the t-slots 29 in the bottom of side support members 27a and 27b to provide light for plants on a tray system below the tray system shown. Wiring to supply power to the LED lights 45 can be run through the lumen in the side support members or in wiring tape run through the t-slots 29. The number and/or wattage of the LEDs and the wavelength emitted can be customized with adjustable cable gland quantity and placement according to the needs of a user of the tray system. Tubing (not shown) may be hung from the t-slot 29 in center support member 26 to supply water to nozzles or emitters to provide irrigation to plants growing on a tray below the tray system shown.

In some embodiments, a duct assembly 20 in combination with a ventilation system 50 can be used in the absence of tray 10 to distribute air in a vertical growing space. For example, a duct assembly 20 by itself without being nested below a tray 10 can be used for a topmost tier of a growing space. The duct assembly 20 would blow down on the tops of the plants on the next lower tier and provide mounting for lighting and/or irrigation systems. In these embodiments, air can be blown up, down, or both up and down and using the duct assembly 20 without tray 10, using holes 23 and/or 24 of the duct assembly 20.

In some embodiments, the tray system may further comprise transverse duct members inserted into holes 31 or 33 in the tray 10 such that they are in fluid communication with holes 23 in the top panels 21 of the duct system to provide an avenue for air to be emitted above the tray 10 and under the leaf canopy of plants growing on top of the tray. Embodiments of transverse duct members are shown in FIGS. 10 through 16.

Figure 10:
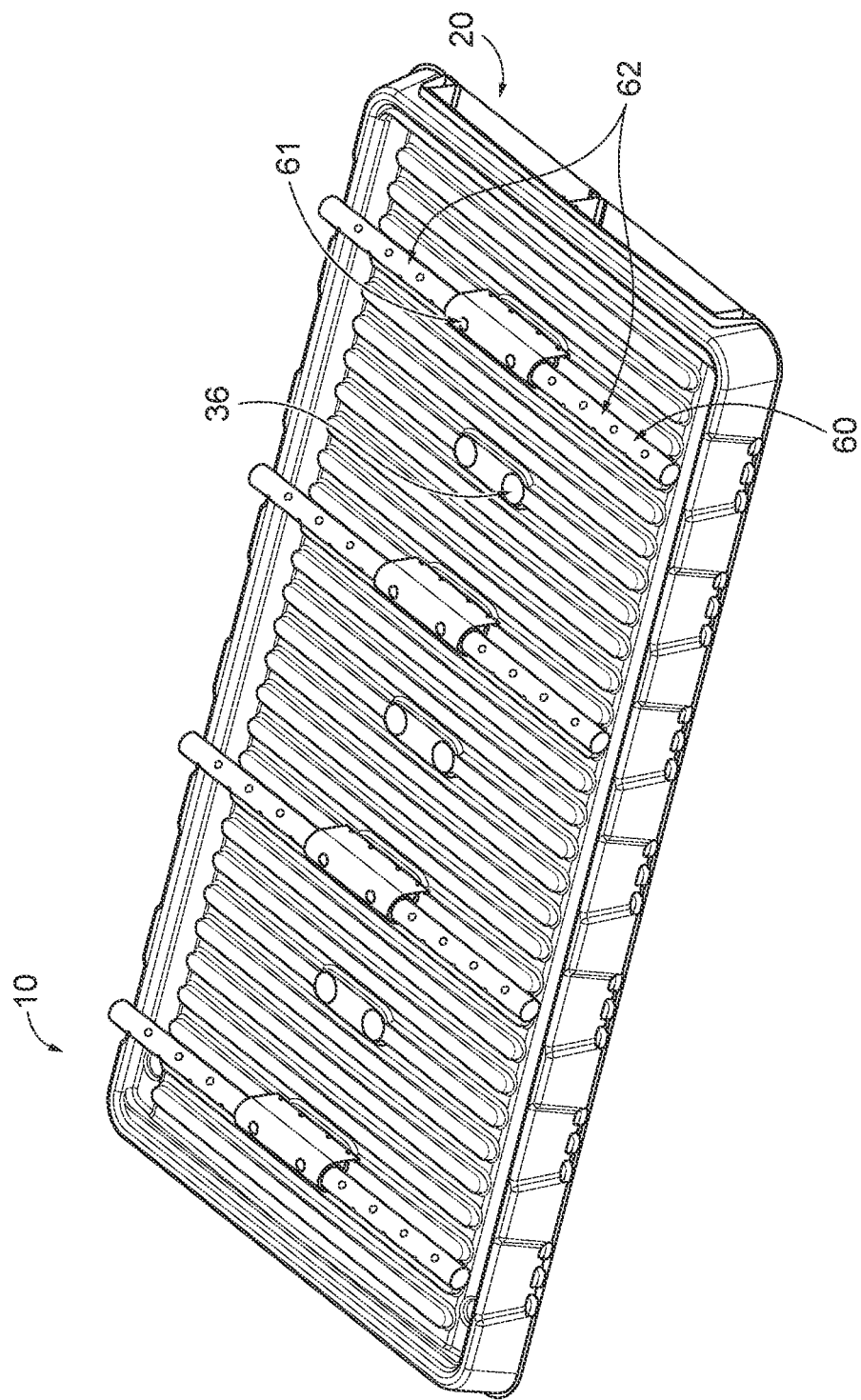
FIG. 10 is a perspective view of the top of the tray system showing transverse duct members, according to an embodiment of the disclosed subject matter.
Figure 11A:
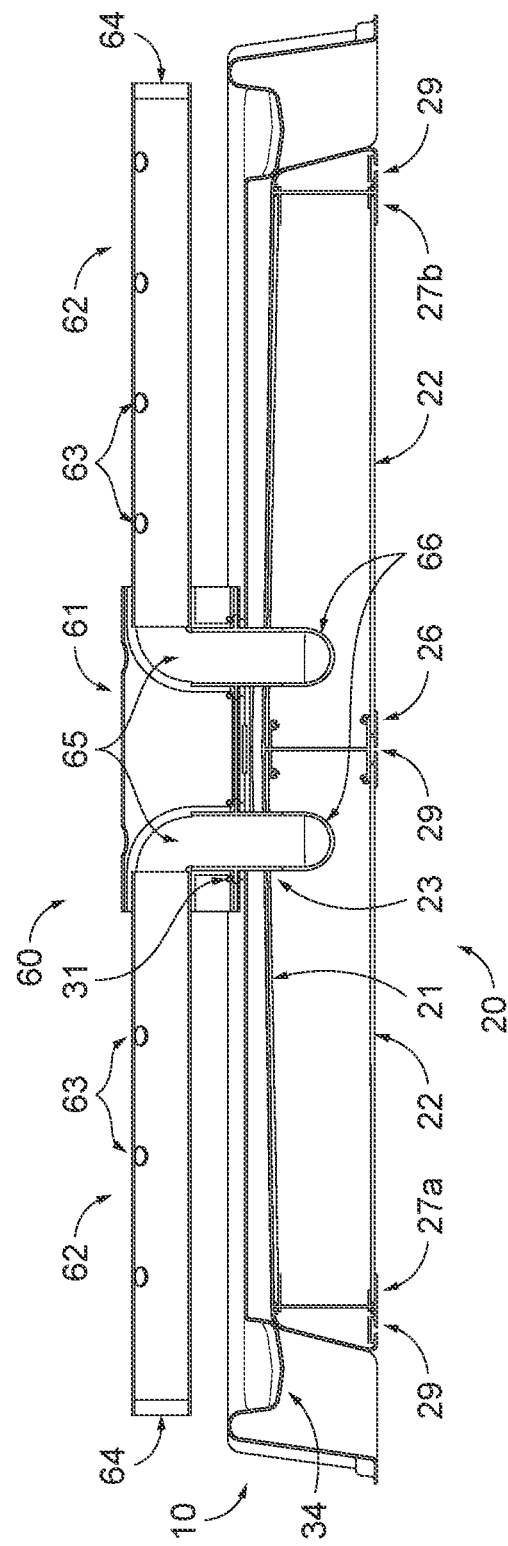
FIGS. 11A and 11B show elevation and perspective views, respectively of a transverse duct member, according to an embodiment of the disclosed subject matter.
Figure 11B:
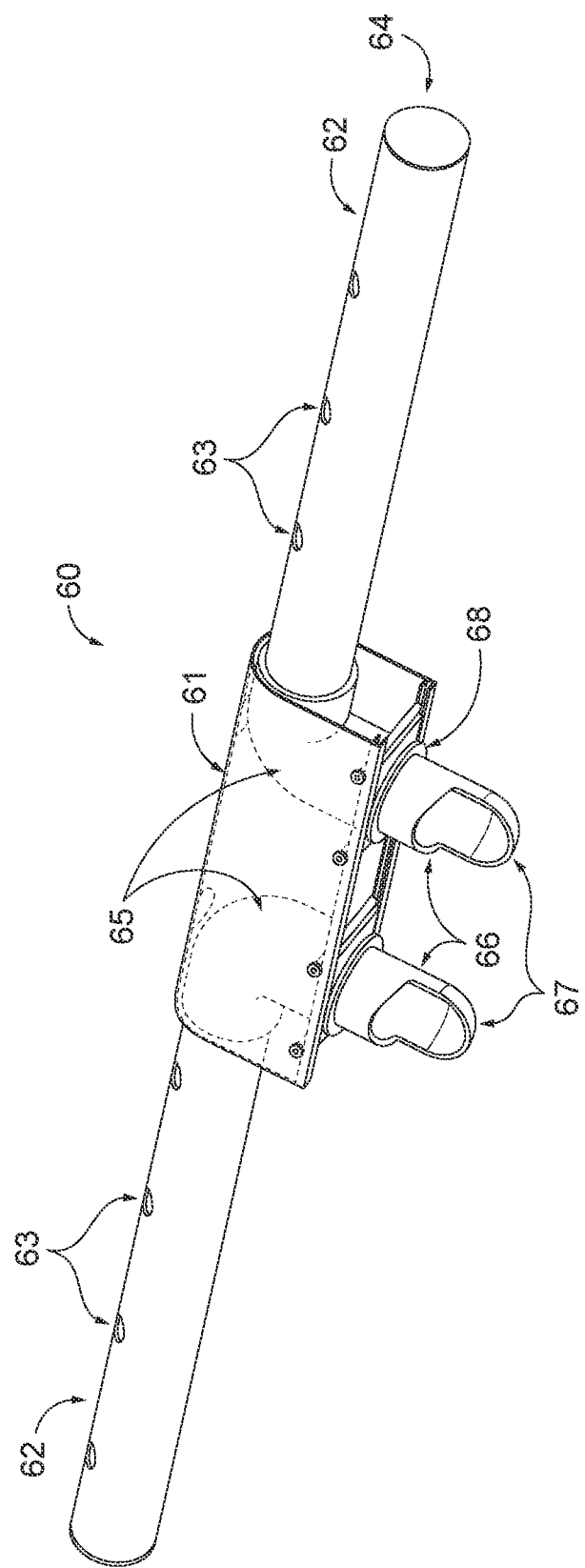

FIG. 10 show a first embodiment of a transverse duct member 60, comprising a central housing 61 and two hollow tubes 62 extending in opposite directions from housing 61. One or a plurality of transverse duct members 60 (four are shown) are inserted into holes 31 in the tray 10 (See FIG. 2). As shown, not all holes 31 need to be used for the transverse duct members 60. Holes 31 not occupied by transverse duct member 60 can be plugged with stoppers 36 so that air cannot flow out. FIG. 11A shows a cross-section of the tray system comprising the transverse duct member 60 and FIG. 11B shows a perspective view of the tray system comprising the transverse duct member 60. Central housing 61 is shown as transparent for ease of presentation and may be configured as a thin arch-shaped shield. Hollow tubes 62 each comprise a plurality of holes 63 to emit air from the tubes 62 above the tray system and are capped with end caps 64. The number and size of the holes 63 are not limited to those shown in the Figures, but may be dependent on the desired air flow for the type of plants grown on the tray system. Hollow tubes 62 are each releasably connected in fluid communication to a curved hollow tube section 65 that in turn is connected in fluid communication to a straight hollow tube section 96. Tubes 62 can be interchanged to customize the number and/or placement of holes 63 in the transverse duct member 60. The holes 63 are desirably placed on the upper side of hollow tube 62 to minimize water from an overhead irrigation system from entering the duct 60. Hollow tube sections 96 are inserted through holes 31 of tray 10 and holes 23 of top panels 21 into the ducts 20a and 20b to provide a pathway for air to flow out of the ducts 20a and 20b, through tube sections 66, tube sections 65, and tubes 62 and out of holes 63 to provide ventilation below the leaf canopy of plants grown on the tray system. Air scoops 67 on the ends of tubes 66 are configured to gather air flowing down the duct assembly 20 from the ventilation system 50 and channel it into the transverse duct member 60. An elastomeric sealing flange or gasket 68 seals the tubes 66 to the inner surfaces of holes 23 and optionally holes 31 to minimize air loss. The components of transverse duct member 60 may independently be made of plastic or metal. In some embodiments, tubes 62 may comprise aluminum extrusions. Tube sections 65, 66 and air scoops 67 may comprise separate pieces, but may be preferably integrated into a single molded piece.

Figure 12:
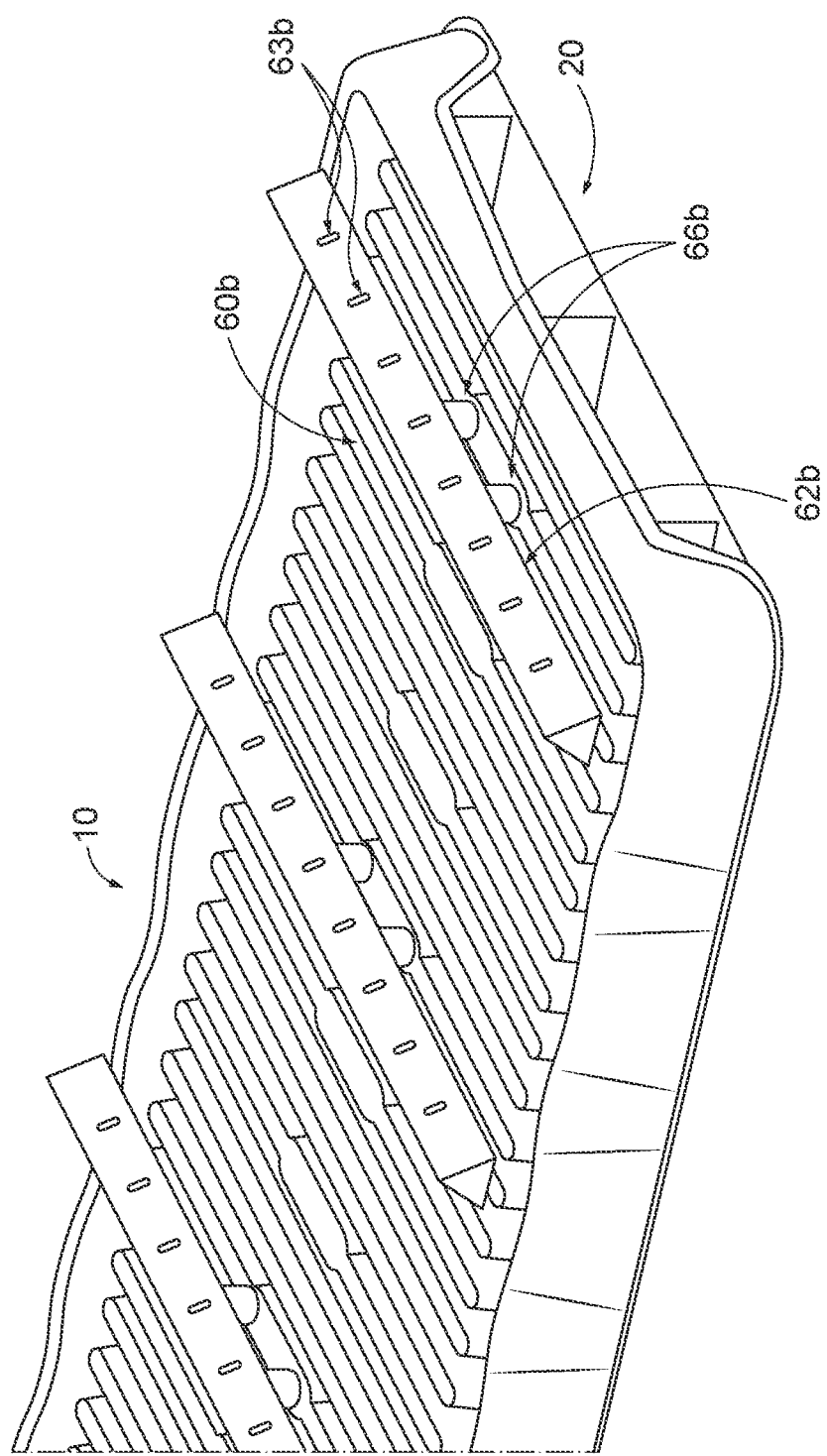
FIGS. 12 and 13 are perspective views of the top of the tray system showing alternate transverse duct members, according to an embodiment of the disclosed subject matter.

FIG. 12 shows an alternative embodiment of a transverse duct member 60b. In this embodiment, the transverse duct member 60b comprises a single hollow tube 62b with a plurality of openings 63b on its sides. In the embodiment shown the hollow tube 62b has a triangular cross section, but in other embodiments, the tube may have trapezoidal or arched cross-sections. Tubes 66b are similar to tube sections 66 of the previous embodiment, but may connect to holes in the bottom of tube 62b instead of curved tube sections 65. In this embodiment, air scoops similar to air scoops 67 and gaskets similar to gasket 68 are envisioned. The height of tube sections 66 or 66b may be varied to allow for customizing the height of the holes 63 or 63b above the tray 10, dependent on the height of plant containers and leaf canopy of plants growing on the tray system.

FIGS. 13 through 16 illustrate aspects of another embodiment of a transverse duct member 60c. In this embodiment, the transverse duct member 60c comprises an arch-shaped elongate member 62c having an open bottom that engages a blowing boss 32 on tray 10a (see FIG. 3), shown in FIG. 13. FIG. 14A shows a close-up top perspective view of the elongate member 62c, which comprises a plurality of openings 63c on an upper side of member 62c. Caps 64c close both ends of elongate member 62c. FIG. 14B shows a close-up bottom perspective view of an end of the elongate member 62c showing open bottom 62c-1. A flange 62c-2 comprising gasket 69 is configured to engage the top and sides of blowing boss 32, as best seen in FIG. 16A.

Figure 15:
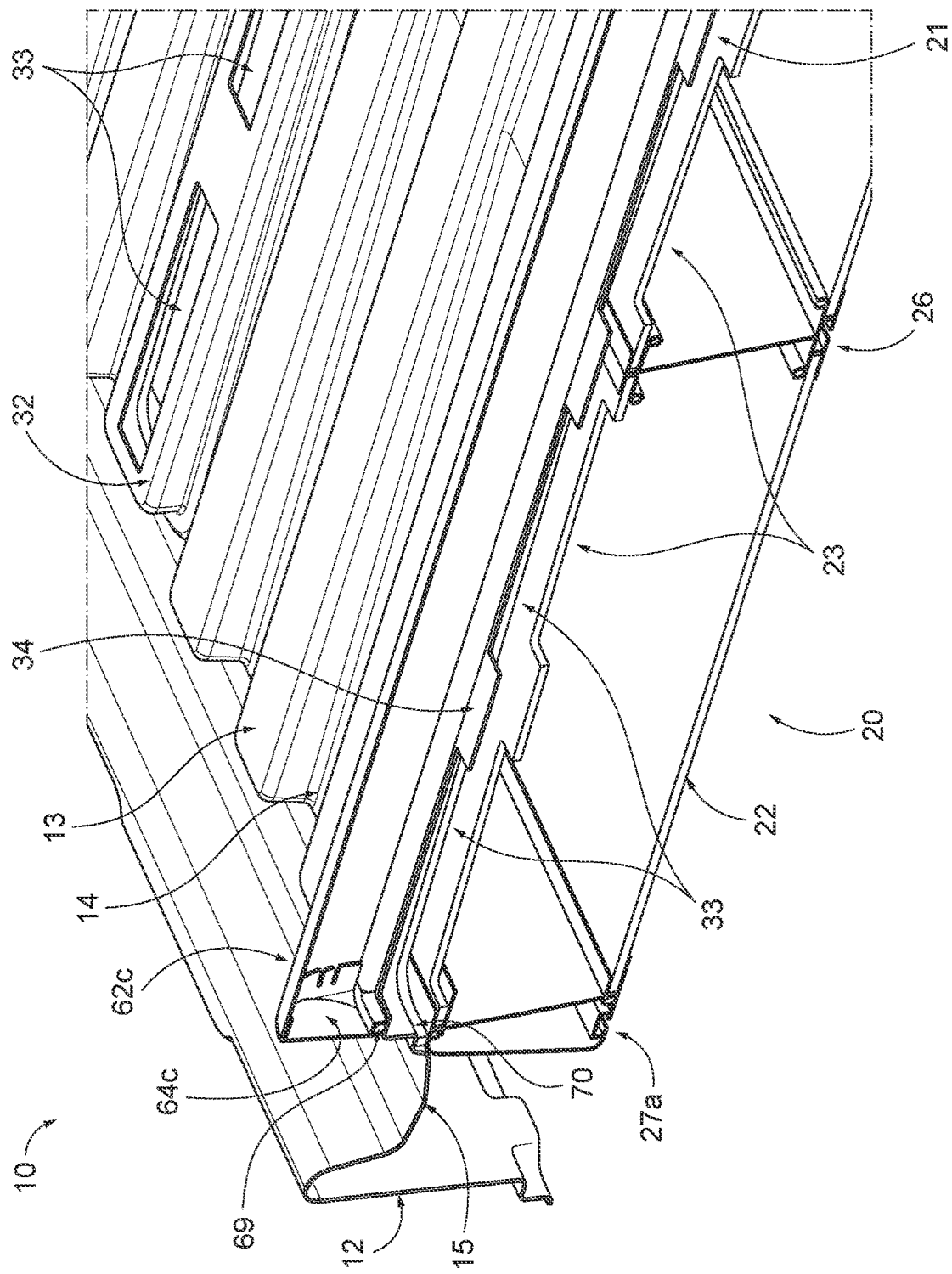
FIG. 15 shows a first perspective cross-section view of the transverse duct member shown in FIG. 13 attached to the tray system, according to an embodiment of the disclosed subject matter.

FIG. 15 shows a first perspective cross-section view of the transverse duct member 60c engaged to blowing boss 32 along line B shown in FIG. 3. Holes 33 in tray 10 are aligned with holes 23 in top panel 21 so that air can flow out of the duct assembly 20 through holes 23 and 33 and the open bottom 62c-1 into the body of elongate member 62c and then through holes 63c to exit above the tray 10 and below the leaf canopy of plants growing thereon. Optional pad 70 on the bottom of blowing boss 32 rests on top panels 21 of duct assembly 20 to minimize vibration caused by airflow through the tray system.

Figure 16A:
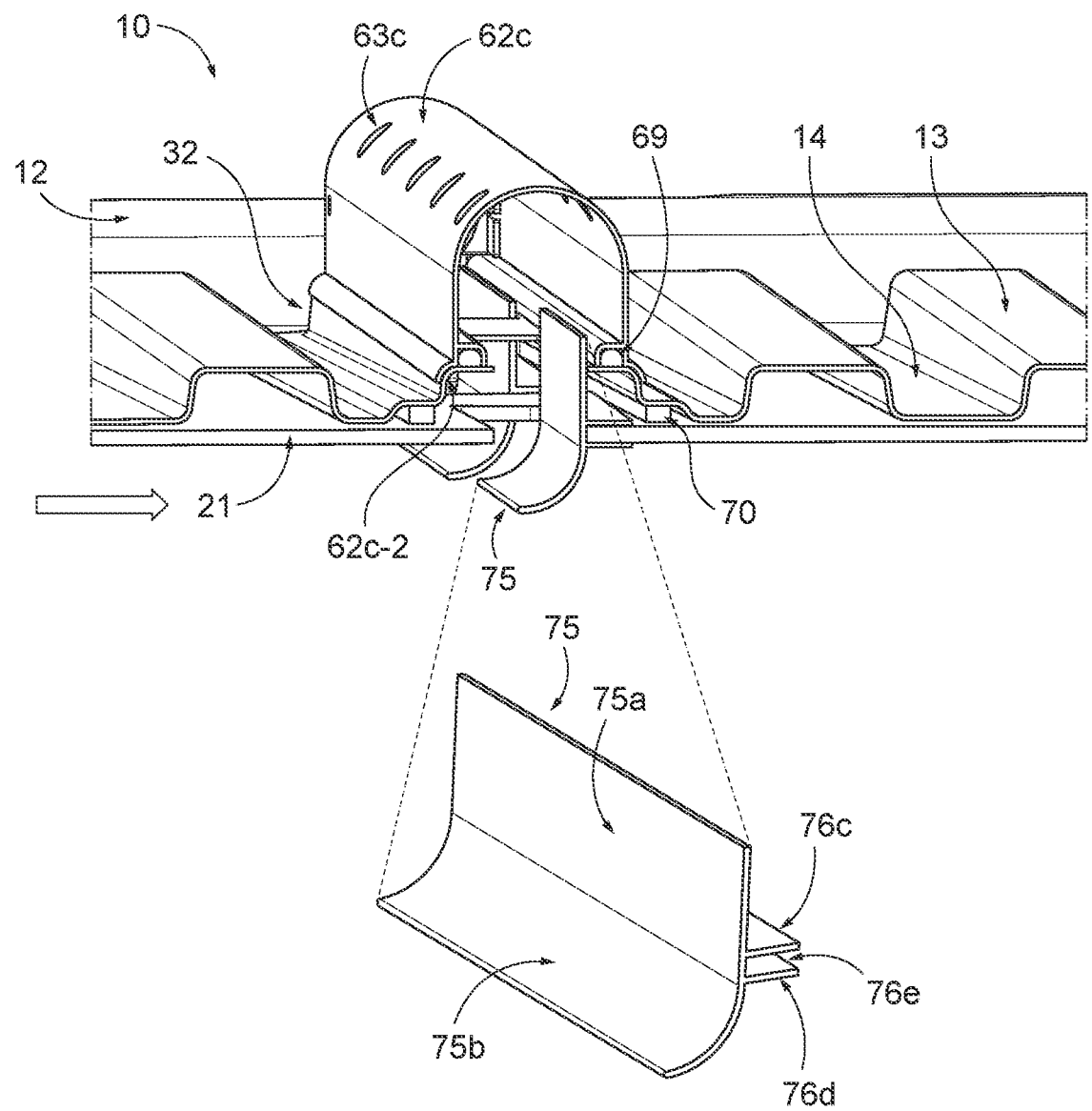
FIG. 16A shows a second perspective cross-section view of the transverse duct member shown in FIG. 13 attached to the tray system, according to an embodiment of the disclosed subject matter.

FIG. 16A shows a second perspective cross-section view of the transverse duct member 60c engaged to blowing boss 32 along line C shown in FIG. 3. The height of member 62c may be varied to allow for customizing the height of the holes 63 or 63b above the tray 10, dependent on the height of plant containers and leaf canopy of plants growing on the tray system. Also shown in FIG. 16 is a turning vane 75 that engages the opening in the top panel 21 to divert air flow through the duct assembly (shown as an open arrow) into the bottom of member 62c via holes 23, 33 and open bottom 62c-1. As shown in the inset, turning vane 75 comprises a vertical section 75a that is configured to extend through holes 23, 33 into the open bottom 62c-1 in the transverse duct member 62c, a curved section 75b that extends into a duct of the duct assembly 20 to direct the air flow. Flanges 75c and 75d define a slot 75e that releasably engages top panel 21.

Figure 16B:
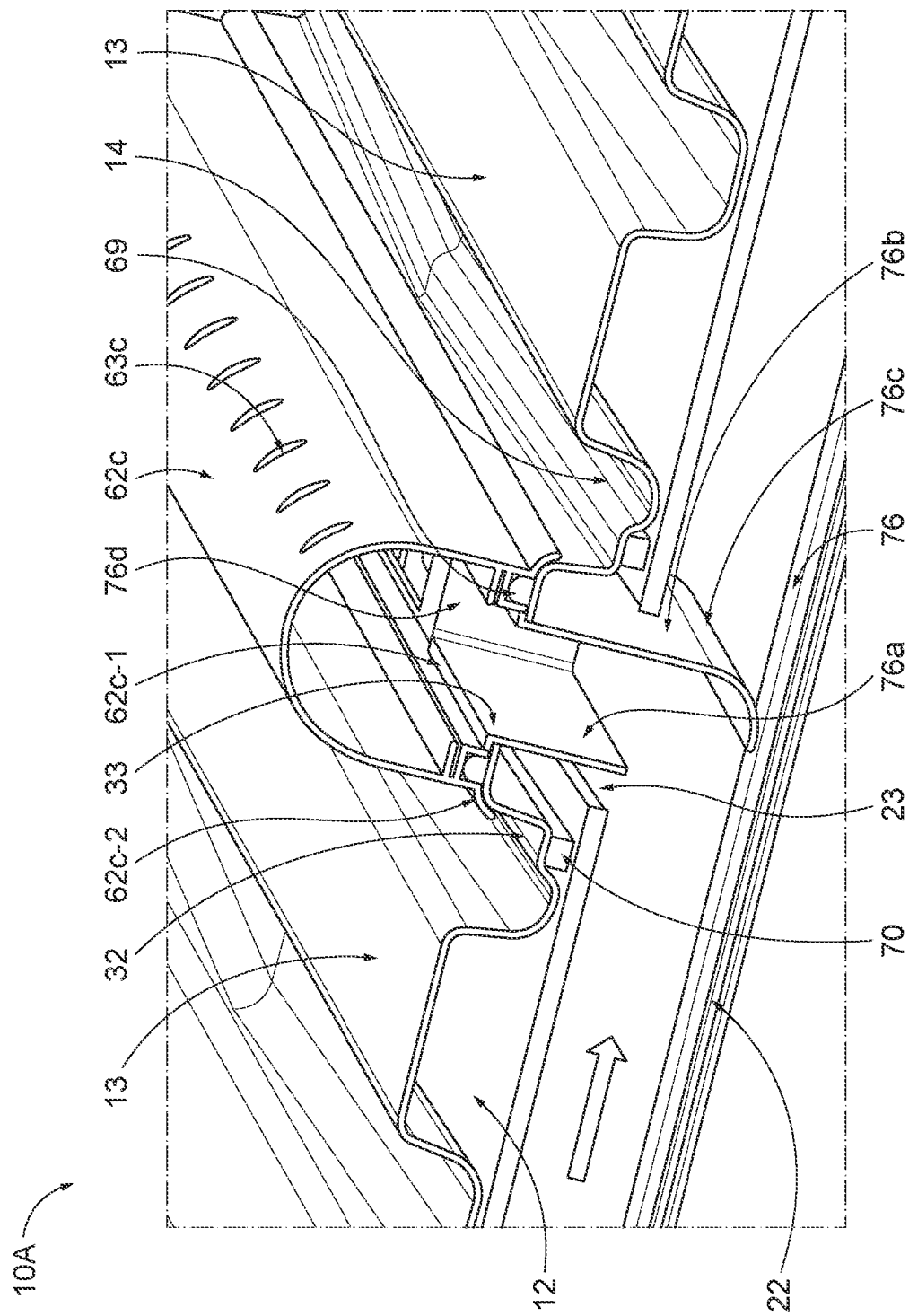
FIG. 16B shows a perspective cross-section view of the transverse duct member shown in FIG. 13 attached to the tray system comprising an alternative turning vane, according to an embodiment of the disclosed subject matter.

In an alternative embodiment shown in FIG. 16B, a turning vane 76 may comprise an air passageway defined by a short side 76a, a long side 76b and two ends 76d dimensioned to fit within and pass through the inner surfaces of holes 23 and 33 and extend into open bottom 62c-1. Curved portion 76c directs air flow from the duct assembly into the transverse duct member. A sealing gasket 69 can engage the blowing boss 32 of tray 10a around the perimeter of a hole 33 and optionally the inner surface of a hole 23 in top panel 21. In this embodiment, the turning vane 76 may be configured similar to the structure comprising a tube 66, air scoop 67 and sealing flange 68 of the transverse duct member 60a shown in FIGS. 14A and 14B, except having a rectangular cross-section.

Figure 13:
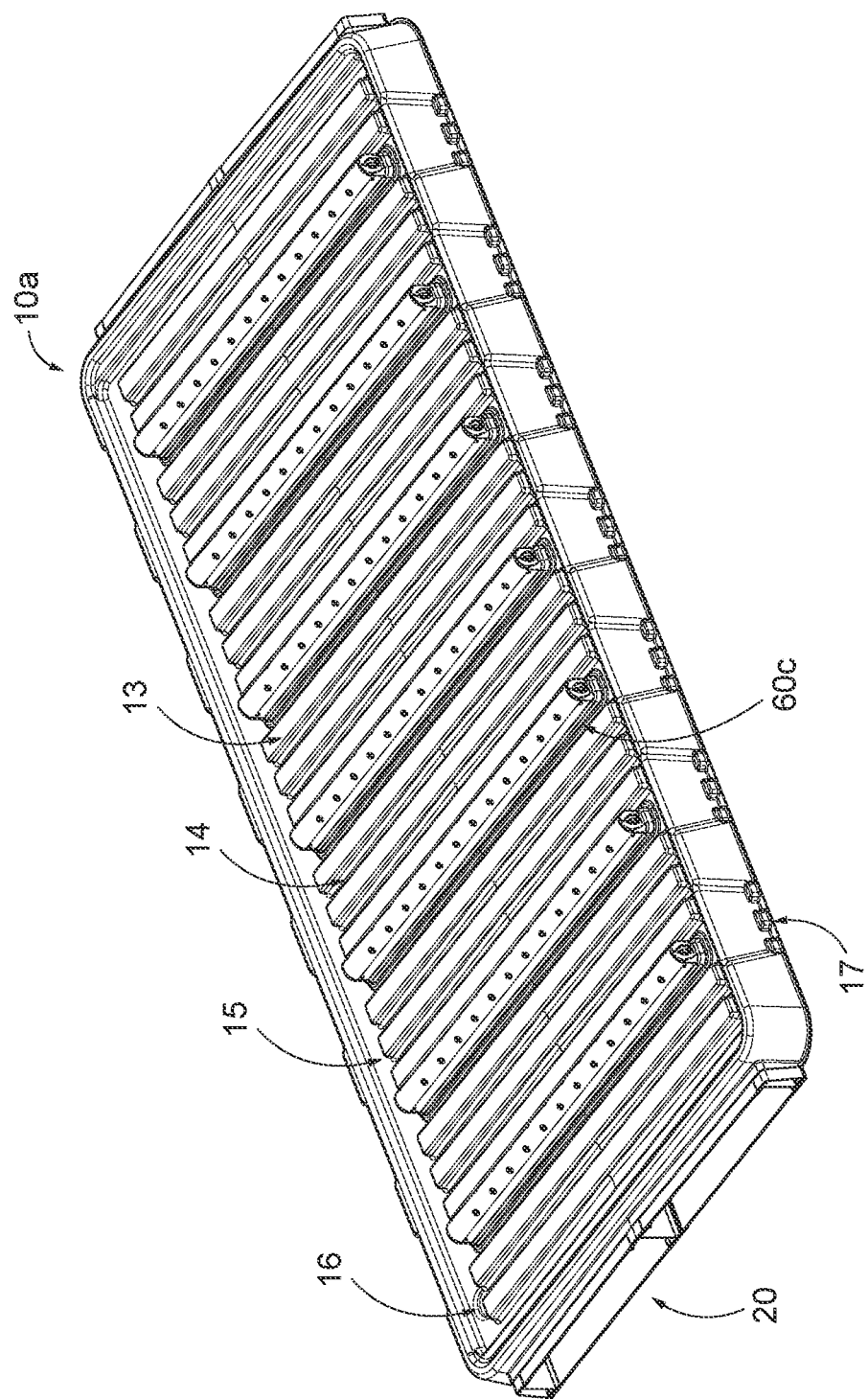
Figure 14A:
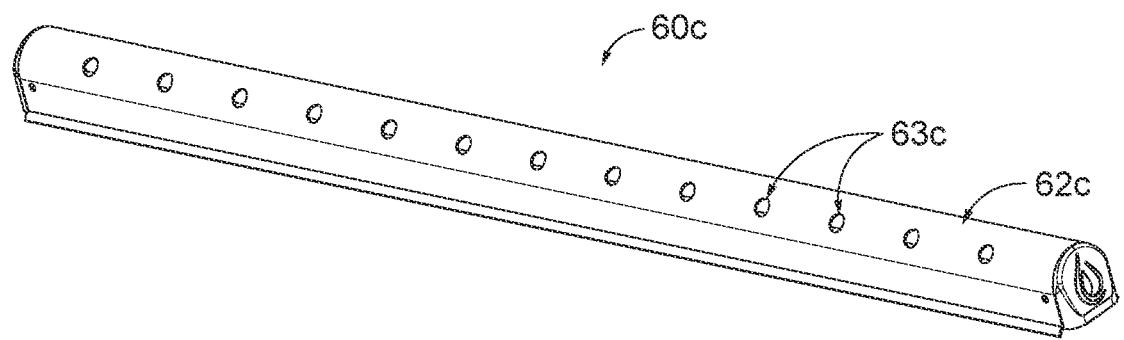
FIGS. 14A and 14B show close-up views of a transverse duct member shown in FIG. 13, according to an embodiment of the disclosed subject matter.
Figure 14B:
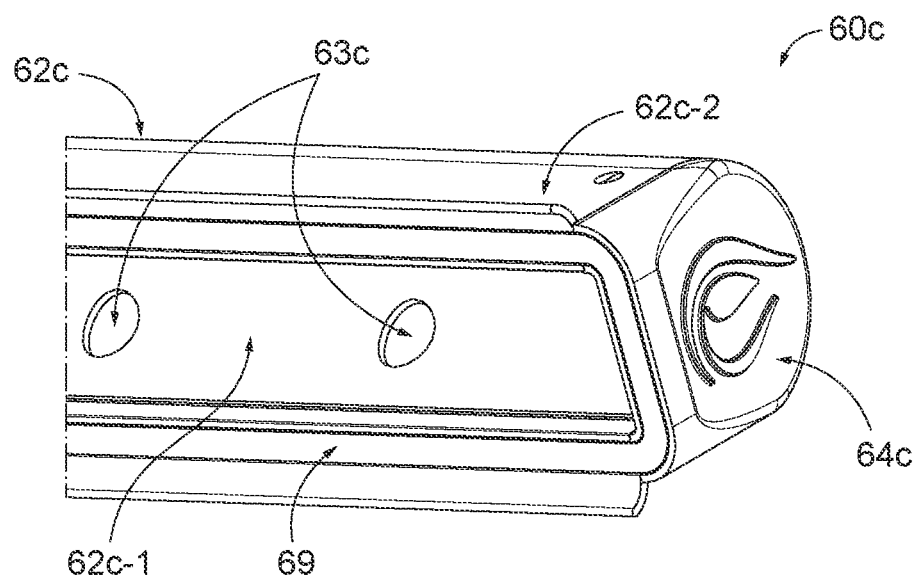
Figure 16C:
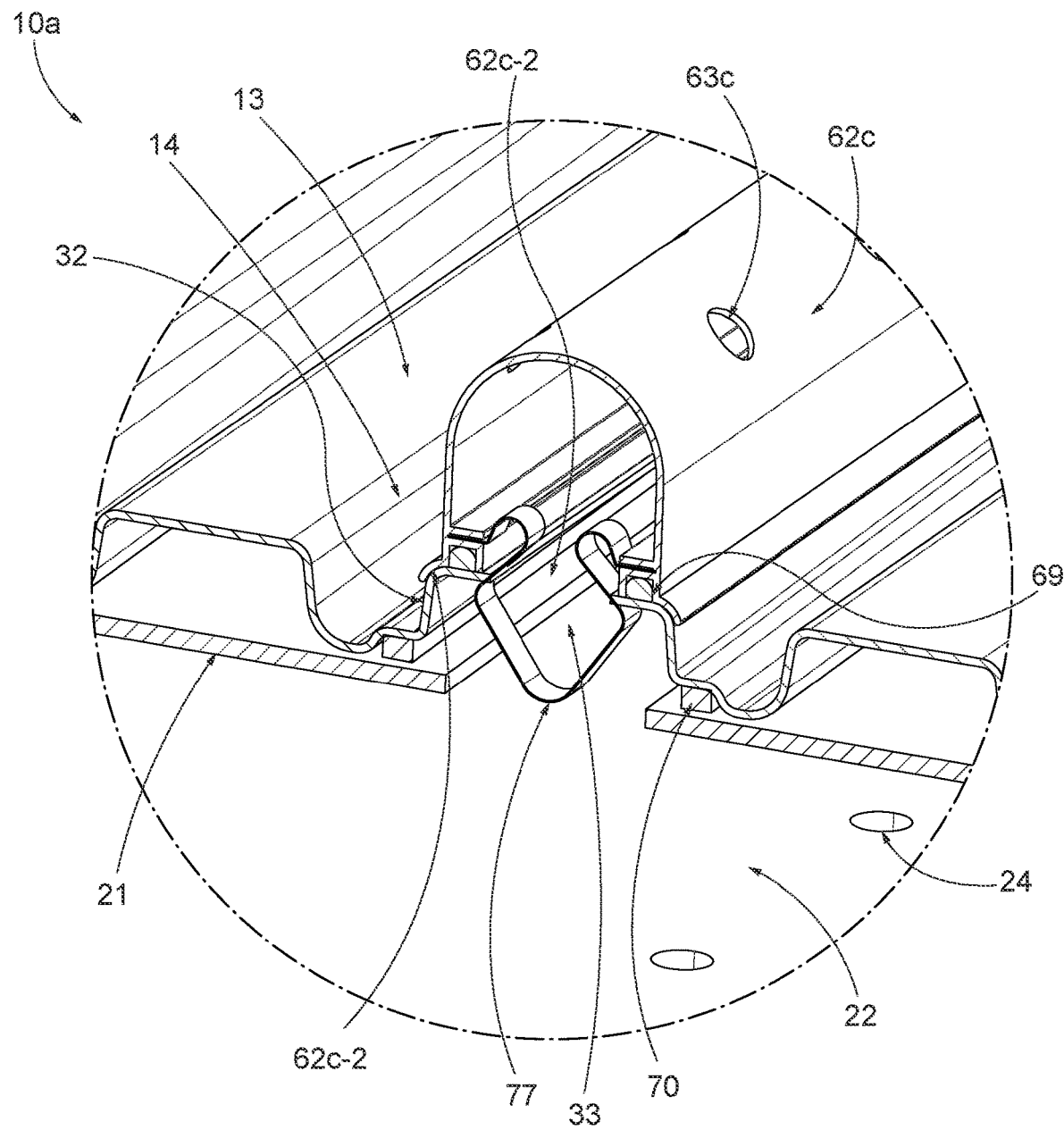
FIG. 16C shows a perspective cross-section view of the transverse duct member shown in FIG. 13 attached to the tray system using a spring clip, according to an embodiment of the disclosed subject matter.

FIG. 16C shows a perspective cross-section view of the transverse duct member shown in FIG. 13 attached to the tray system using a spring clip 77, according to an embodiment of the disclosed subject matter. The spring clip 77 may comprise a thin, resilient strip of metal or plastic configured to engage the open bottom 62c-1 of the elongate member 62c and an opening 33 in blowing boss 32. This clip 77 is not limiting, and other attachment mechanisms can be used.

In FIGS. 13 and 15, transverse duct member 60c is shown as extending the full length of blowing boss 32 and in fluid communication with both ducts 20a and 20b of duct assembly 20, but this is not limiting. In some embodiments, transverse duct member 60c may be shorter, having a length less than half the length of blowing boss 32 and in fluid communication with only one duct in duct assembly 20.

In some embodiments, the tray system may comprise one or more duct members configured to engage a subset of holes 31 or 33 in tray 10 that are disposed perpendicular to ends 11 and parallel to the sides 12 of tray 10, and a set of corresponding holes 23 in top panel(s) 21 of the duct assembly 20 and direct air above the tray system. Air flow within these parallel duct members is also parallel to the air flow within the duct assembly 20. For example but not limitation, parallel duct members may engage holes proximate to the sides 12 of tray 10 and/or the center of tray 10. Design principles of embodiments of the parallel duct members are similar to those discussed above for transverse duct members 60, modified to reflect the different orientation of the parallel duct members.

In some embodiments, the tray system may comprise a combination of transverse and parallel duct members.

Figure 17:
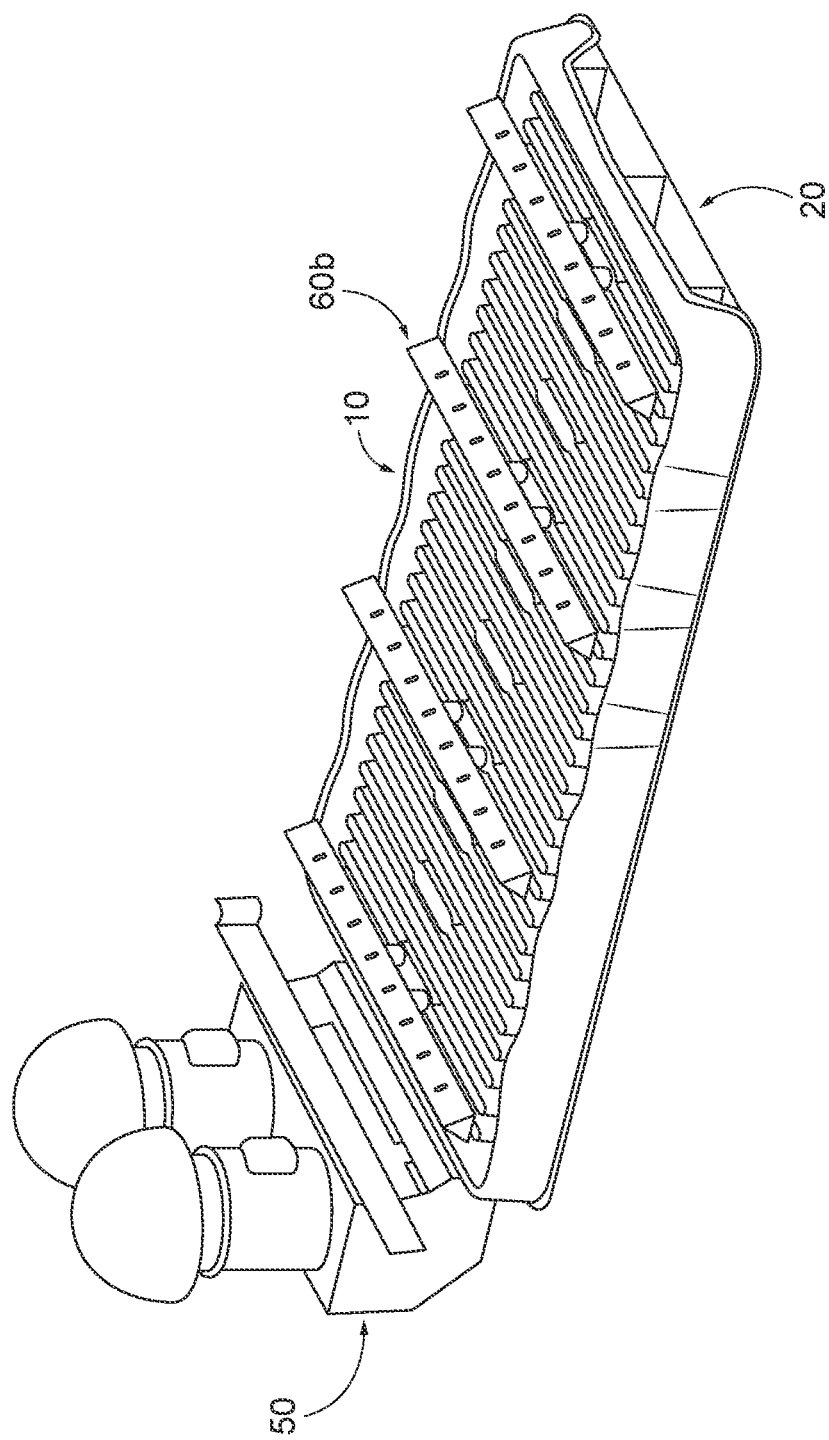
FIG. 17 is a top perspective view of a tray system connected to a fan assembly, according to an embodiment of the disclosed subject matter.
Figure 18:
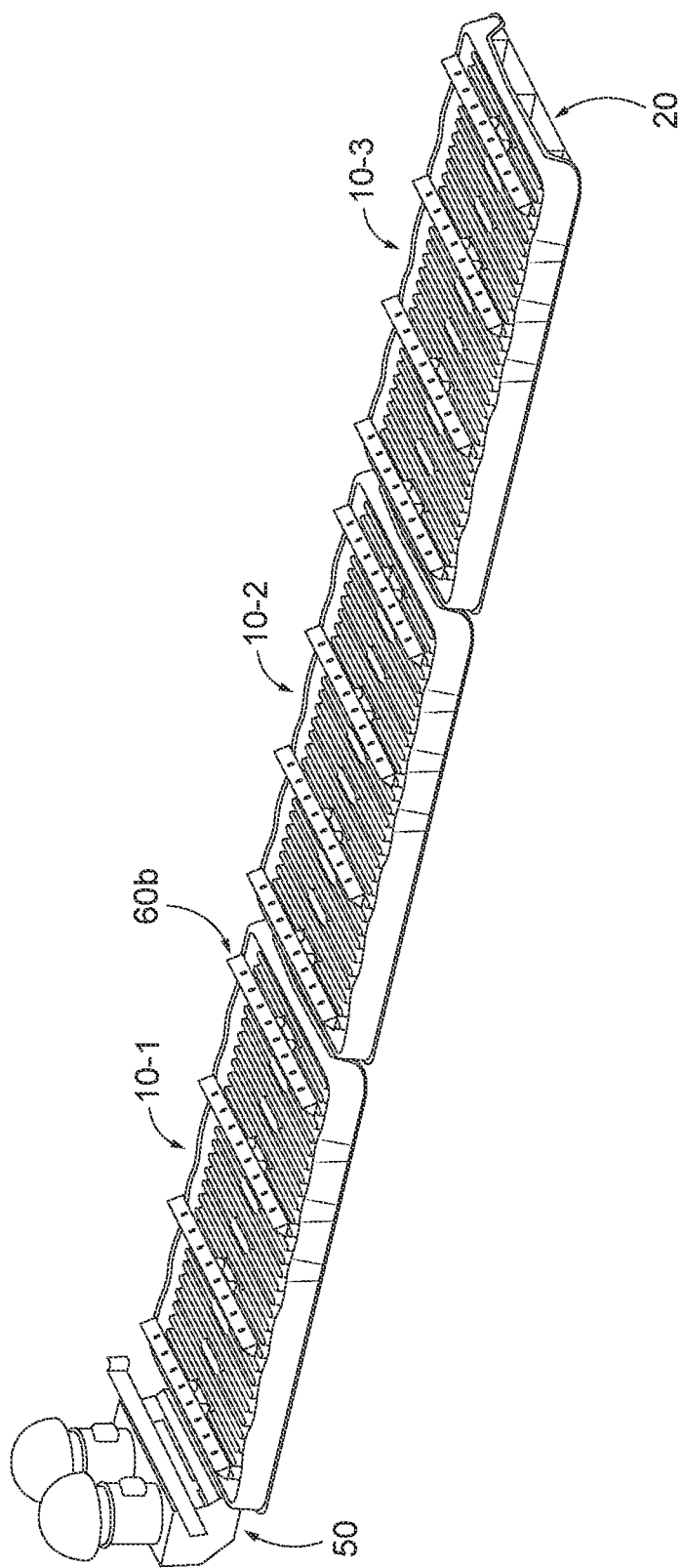
FIG. 18 is a top perspective view of a plurality of the tray systems connected end-to-end, according to an embodiment of the disclosed subject matter.

Each end of the duct assembly 20 is configured to releasably connect to a ventilation (blowing) system 50 or to another duct assembly 20 in an end-to-end configuration (see FIGS. 9, 17 and 18). As shown in FIGS. 9, 17 and 18, one end of the duct assembly 20 is engaged with a ventilation system 50 such that duct assembly 20 is in fluid communication with the ventilation system 50 so that air can be driven by the ventilation system the length of the ducts within the duct assembly 20 and through holes 23 in top panel 21 to distribute air above the duct assembly 20 through holes 24 in bottom panels 22 to distribute air below the duct assembly 20, or through holes 23 in top panel 21 and through holes 24 in bottom panels 22 to distribute air above and below the duct assembly 20.

The ends of the ducts may comprise a fitment to connect to the ventilation system 50 or to each other. For example, the fitment may comprise an elastomeric sleeve configured to engage the inside of ducts 20a and 20b and a corresponding opening in the ventilation system 50. In an embodiment, the airbox 51 (see FIG. 19) has a flange which fits tight against the end of the duct. The t-slots are then used with angled brackets to bolt directly onto the airbox 51. Individual duct-to-duct connections are made using the pins and t-slots, as well as an "H"-shaped extrusion where each opening in the H engages one of the panels. One end of duct assembly 20 can be connected to the ventilation system 50 as shown in FIGS. 9 and 17 and the other end opposite the ventilation system 50 can be closed with a cap (not shown), to prevent air flow out of that end of the duct assembly 20, and instead air flows out of orifices 24, when present, and/or holes 23, when present. The end plate (cap) at the distal end of the duct can be attached directly to the small alignment holes or lumens 40 in the support member extrusions with screws threaded into the holes.

In other embodiments, the tray systems may be connected end-to-end as shown in FIG. 18 to provide a longer growing platform in a rack system. In the embodiment shown, three tray systems 10-1, 10-2 and 10-3 are connected end-to-end. In some embodiments, each tray 10 can have its own respective duct assembly 20. In the embodiments shown in FIGS. 17 and 18, the tray systems comprise a plurality of transverse duct members 60b, but this is not limiting.

The duct assemblies 20 that nest within the trays 10 may be connected together by means of connectors inserted in the "t-slots" 29 and/or pegs inserted into the circular lumens 40 in the cross-sections of the side and center support members. The joints between support members 26, 27a and 27b and top panels 21 and bottom panels 22 may be staggered. Staggered joints will allow one extrusion or panel section to support two or more trays, to provide stiffness to the overall assembly of trays. In other embodiments, the ducts 20 may be configured as a continuous duct disposed under a plurality of trays 10. The trays 10 are nested on top of but not vertically constrained by the ducts 20. Individual trays 10 (e.g. tray 10-1) can be removed (lifted) from the duct assembly 20, wherein the duct assemblies 20 are configured as connected end-to-end or as continuous ducts.

Preferably, the distribution and size of orifices 24 in bottom panels 22, when present, holes 23 in top panels 21, when present, and/or holes 31 or 33 in tray 10, when present, can be tailored to maintain a specific flow distribution. The orifices 24, when present, and/or holes 23 in top panels 21, when present, may vary in size or density along the length of the duct assembly 20 so as to maintain an equal flow distribution along the duct length. As the air travels along the length of the duct, pressure is lost due to air exiting the duct, friction and other factors that results in a higher duct pressure at the end or ends featuring the blowers and tapering off along the length of the duct. By tailoring the size or quantity of the orifices it is possible to even out the air distribution over long lengths of duct assembly 20. Analysis of air flow within the ducts 20a and 20b allows tuning the size and distribution of orifices to meet the requirements for growing plants. One can appreciate that the distribution may be different for different plants and growing conditions.

In some embodiments, the duct assembly or assemblies 20 can be connected at both ends to a ventilation system 50, such as when the duct assemblies comprises long duct runs. Ventilation systems 50 at both ends of the duct assembly 20 can drive air toward the middle of the duct run and even out air distribution along the entire duct run.

Generally, the ventilation system 50 may comprise air passage(s) configured to be connected to and in fluid communication with the duct(s) of the duct assembly 20. One or more fans can drive air through the air passages into the ducts of the duct assembly 20 and out holes in the top panels 21 and/or bottom panels 22 of the duct assembly 20. The ventilation system can optionally comprise one or more components that can amend the air as desired before it enters the duct assembly 20 selected from filters, heaters, coolers, dehumidifiers, humidifiers, $CO_2$ injection, ozone injection or ultraviolet lights, the latter two of which can be used to neutralize mold spores or pathogens.

Figure 19:
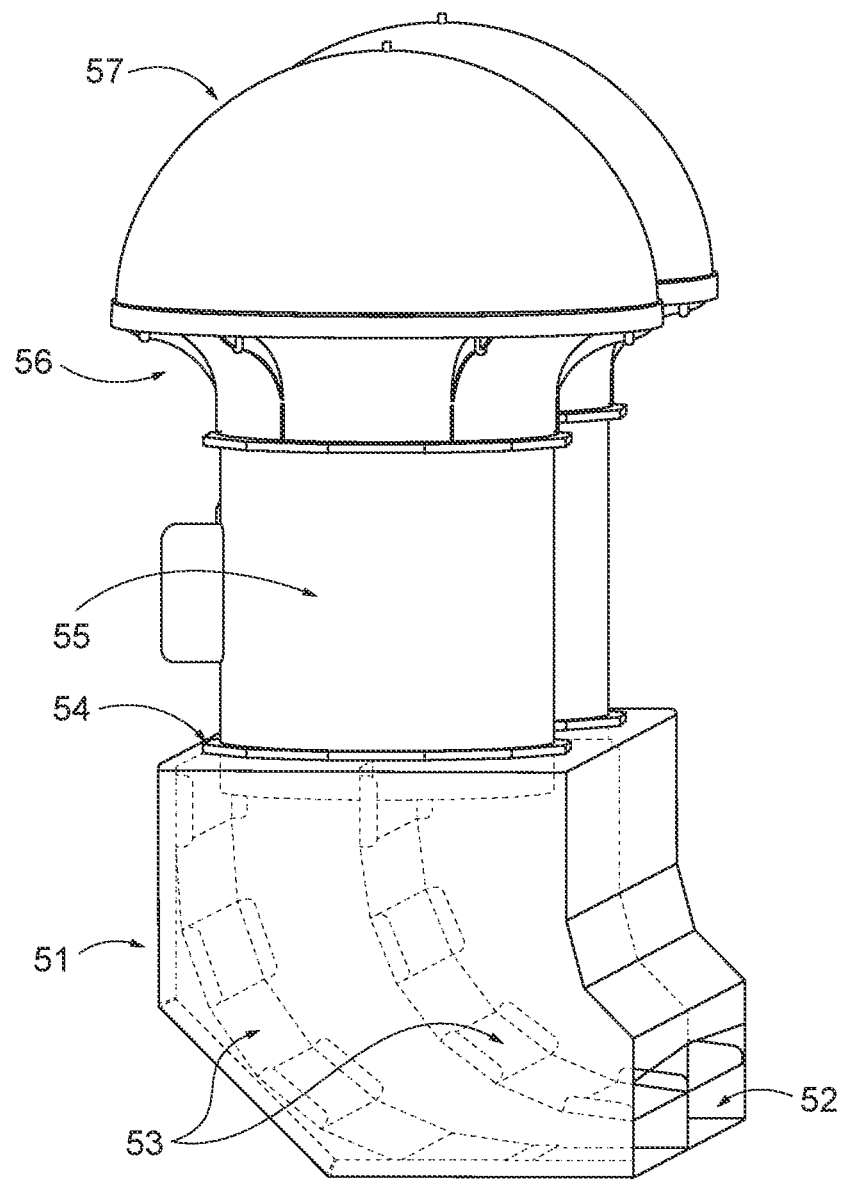
FIG. 19 shows a fan assembly of the try system, according to an embodiment of the disclosed subject matter.

Aspects of an embodiment of a ventilation or blowing system 50 are shown in FIGS. 19 and 20. In this embodiment, the ventilation system 50 comprises an air box 51 (shown as transparent for ease of presentation) comprising an air passage wherein a first end 52 is configured to engage an end of the duct assembly 20 and the other end 54 is configured to accept a fan 55. The intake filter is attached to the intake side of the fan 55, and the outlet side of the fan feeds the air box 51. In some embodiments a single fan is mounted in the center of the airbox and its flow is split by the center support in the airbox 51 and fed to both ducts. In the embodiment shown, opening 52 and opening 54 are oriented at 90 degrees (perpendicular) relative to each other and the air passage comprises one or more turning vanes 53 to efficiently turn the air 90 degrees while constricting down to match the opening in the tray ducts while reducing pressure loss. The fan is compressing the air in this case. There will be an acceleration and velocity increase through the turning vanes and constriction which will serve to lower the static pressure but increase the dynamic pressure. The turning vanes are designed to minimize losses while this transition is occurring. The air box may include $CO_2$ injection, ozone injection and/or ultraviolet light bars. The perpendicular orientation of openings 52 and 54 is not limiting and can be at any angle, or parallel, and the turning vanes 53 configured accordingly. A bell-shaped inlet 56 at the intake passage in the fan 55 opposite opening 54 draws ambient air through a filter assembly 57. In other embodiments, filter(s) may be disposed in the air passage of the airbox 51.

Figure 20A:
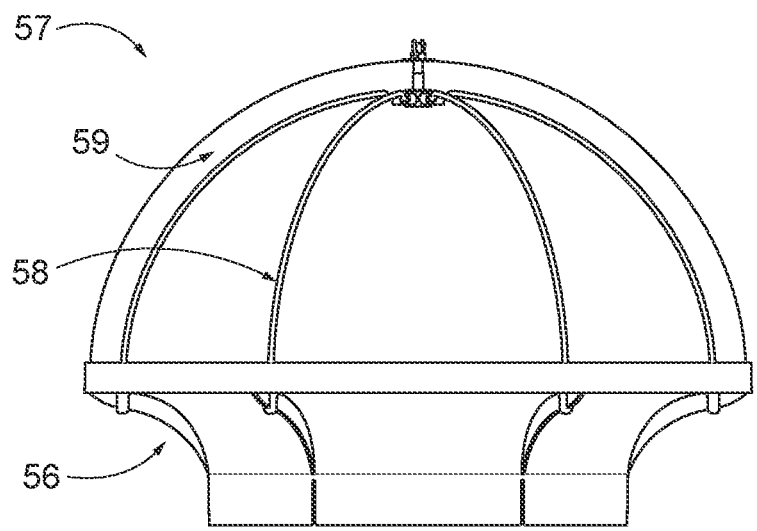
FIGS. 20A and 20B show views of the filter component of the fan assembly of a ventilation system, according to an embodiment of the disclosed subject matter.
Figure 20B:
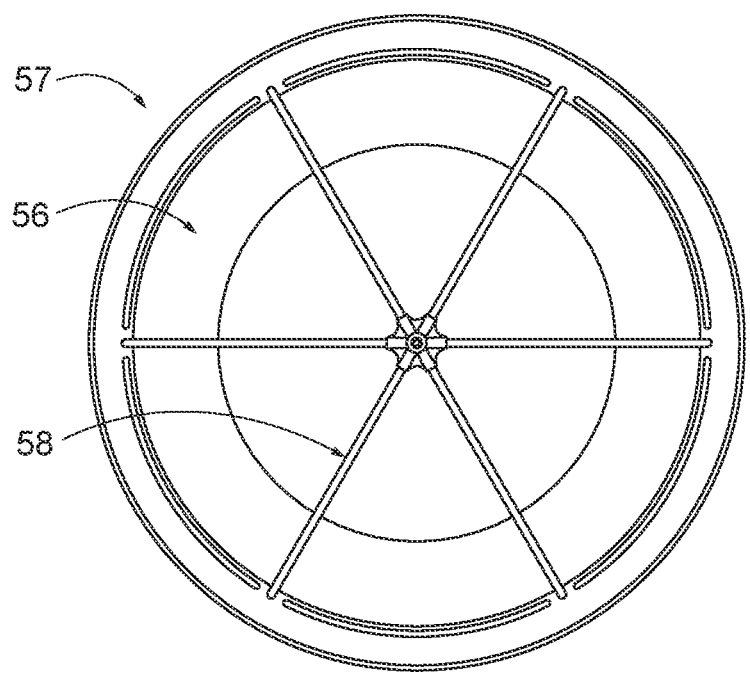
Figure 20C:
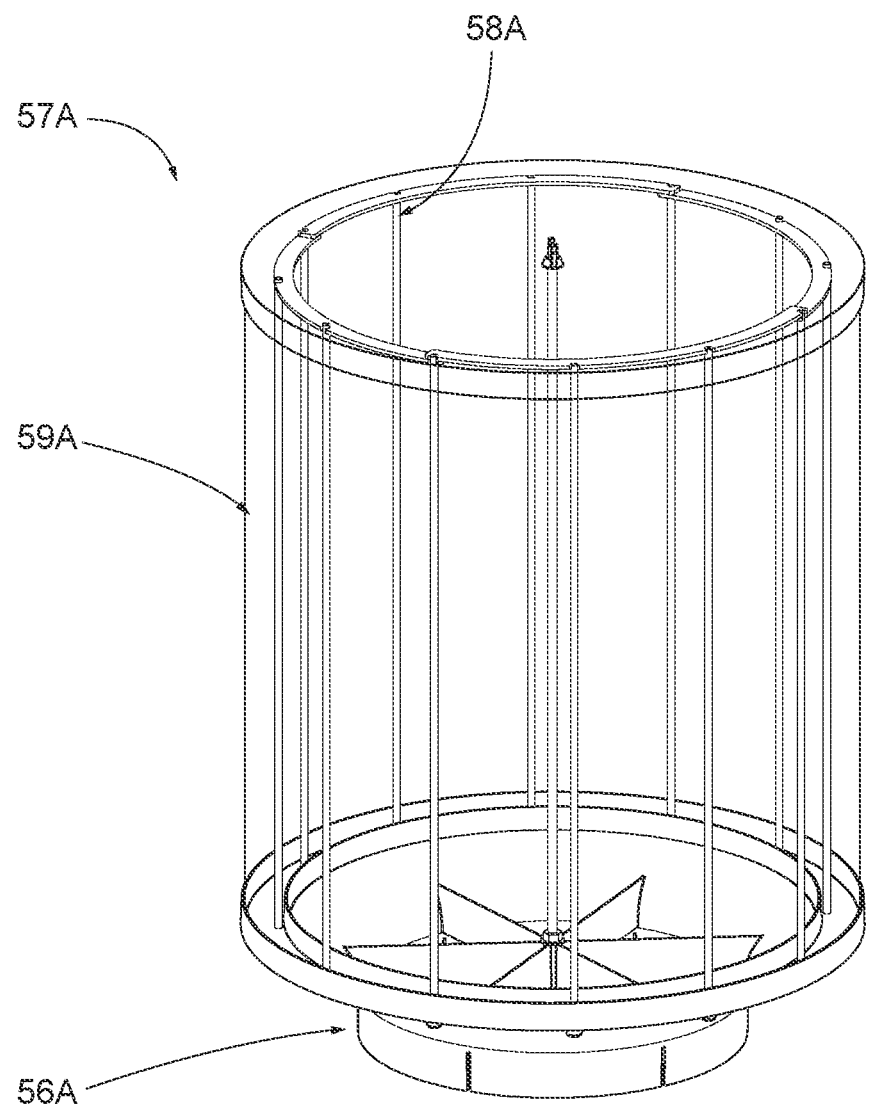
FIG. 20C shows a view of a filter component of the fan assembly of a ventilation system, according to an alternative embodiment of the disclosed subject matter.

FIGS. 20A and 20B show a cut-away view and a plan view, respectively, of the filter assembly 57. In FIG. 20A, the filter assembly 57 comprises a domed framework 58 attached to the inlet 56. The framework 58 supports a dome-shaped filter 59 that filters ambient air as it enters the ventilation system 50. The filter 59 may be disposable or preferably reusable. FIG. 20B shows an overhead plan view of the inlet 56 and framework 58. The domed filter provides an increased filter area compared to a flat filter, but the dome configuration is not limiting. Alternatively, the filter may comprise a cylinder filter that is designed to take a foam outer filter, or a cartridge element filter. For example as shown in FIG. 20C, in other embodiments the filter assembly 57A may comprise a hollow cylinder of filter medium 59A supported by a framework of narrow ribs 58B in the shape of a cylinder. Inlet 56A may be adapted to support a filter cartridge (not shown) and may be configured to engage a fitting on the filter cartridge. The housing is converted to accept the cartridge element by removing the support rods running between the top and bottom housing. Notably, the cross section of the air passage through the entire ventilation system 50 gradually decreases in cross section and angle, reducing pressure losses and increasing efficiency.

In the embodiment shown, each of ducts 20a and 20b of the duct assembly is fed air from one structure shown in FIGS. 19 and 20 (see also FIGS. 17 and 18). In other embodiments, the elements of the structure shown in FIGS. 19 and 20 may provide air to a plurality of ducts in duct assemblies 20 from a single unit. For example, a central ventilation system can collect and treat ambient air and delivery conditioned air to a plurality of ducts in duct assemblies 20 via a manifold or network of pipes or tubing.

The disclosed tray systems can be supported in one or more tiers of a rack system in which they are installed. A rack system generally comprises a stationary or mobile platform comprising a plurality of vertical support members or posts and horizontal side members connected thereto and which are arranged in one or more tiers to allow multiple growing levels. The side members typically connect to a support post on 8-foot (2.4 meters), 10-foot (3 meters) or 12-foot (3.7 meters) intervals. The side members are connected to two or more cross members per span, which lay perpendicular to the long axis of the rack system and support the duct extrusions (support members 26, 2a and 27b) of the duct assembly 20 in two or more places. The spacing between tiers varies based on plant height but can range from 1 foot (0.3 meters) to 16 feet (4.9 meters), preferably having a spacing between 1 foot (0.3 meters) and 8 feet (2.4 meters), such as a spacing of around 4 feet (1.2 meters).

The tray may be captured by raised edges of side members making up the rack system if they are present, wherein the edges of the rack tier prevent the tray 10 from translating side to side or front to back. The duct 20 may also be constrained by the tray(s) 10 it nests within. Alternatively or additively, the duct assembly 20 may be attached to the rack system by means of clamps bearing on the cross members and mounting in the t-slots 29 of the support members 26, 27a and/or 27b. The duct assembly 20 would be placed and aligned on the rack cross members and then clamped in place with clamps engaged in the t-slots 29. When the duct assembly 20 is locked to the rack system, it can also restrain movement of a tray 10 disposed above the duct assembly 20.

In an embodiment, the rack system is configured to have a single tray system supported at each level of the rack system. In this embodiment, the lengthwise dimensions of the tray 10 and the duct assembly 20, including the top and bottom panels 21, 22, and support members 26, 27a and 27b, are generally the same and may be slightly shorter than the length of the tier. In another embodiment, the rack system is configured to have a plurality of tray systems connected end-to-end supported at each level of the rack system. In this embodiment, the lengthwise dimensions of a tier in the rack system may be slightly larger than the combined lengths of the trays 10 and the duct assemblies 20, including the top and bottom panels 21, 22, and support members 26, 27*a* and 27*b*. In other embodiments, the rack system is configured to have a plurality of tray systems side-by-side supported at each level of the rack system.

FIG. 21 shows a representative rack system 80 comprising a platform 81 with a raised perimeter 82 and bottom 83 to provide a basin to retain excess water drained from trays 10 placed on the rack system 80. A wire grid 84 can support a tray system 10 (not shown in this view) as a lowest tier of the rack system 80. Vertical posts 85 are slidingly engaged to raised perimeter 82 so that their spacing can be adjusted. Cross members 86 engaged to posts 85 support trays 10 in a raised tier of the rack system 80. Cross members 86 can be moved up or down on the vertical posts 85 to adjust the height of the tier above platform 81. Two trays 10 laid end to end are shown in this view, each supported by two cross members 86. Duct assemblies 20 underlying the trays 10 are obscured in this view, but are also supported by the cross members 86. A ventilation system 50 as shown in FIG. 19 proximate to side 11 of tray 10 is connected in fluid communication to the duct assembly 20 through the open wall of side 11. A plant 90, for example a poinsettia, in a container is shown on one of the trays 10. Transverse duct members 62*d* are shown, which are similar to the embodiment of a transverse duct member shown in FIGS. 11-13, absent housing 61.

Additional embodiments include systems that incorporate the de-stratification duct assembly 20 nested under the bottom of the tray 10 and include additional components to provide the growing plants to be drenched, flooded, drip irrigated or misted with water and nutrients therefrom; and/or components such as growth lamps to provide light for photosynthesis.

In another aspect, also provided is a method for cultivation of plants, the method comprising: providing a tray system according the tray system described above, including any embodiments disclosed herein, alone or in any combination; connecting the duct assembly of the tray system to a ventilation system; connecting the tray to a fluid drainage system; placing a container containing growth medium and viable plant material on the tray of the tray system; flowing air from the ventilation system through the duct assembly and out of the plurality of orifices; providing water or liquid plant nutrient to the plant material; and collecting excess water or liquid plant nutrient in the raised region of the tray and conveying the excess water or liquid plant nutrient into the fluid drainage system via a gutter.

This aspect comprises the following embodiment. A method for cultivation of plants, the method comprising: providing a tray system as described above, including any or all embodiments; connecting the tray system to a ventilation system and a fluid drainage system; placing a container containing growth medium and viable plant material on the ridges of the upper tray of tray system; flowing air from the ventilation system through the first and second hollow elongate duct members and out the plurality of orifices; providing water or liquid plant nutrient to the plant material; and collecting excess water or liquid plant nutrient in the valleys of the upper tray and conveying the excess water or liquid plant nutrient into the fluid drainage system via the gutter.

Disclosed herein is method for cultivation of plants, the method comprising, providing a tray system as described herein comprising a tray 10 and a duct assembly 20, comprising any or all embodiments described herein, alone or in any combination; connecting the duct assembly of the tray system to a ventilation system and the tray to a fluid drainage system; placing a container containing growth medium and viable plant material on the tray of the tray system; flowing air from the ventilation system through the duct assembly 20 and out a plurality of orifices disposed on the duct assembly 20; providing water or liquid plant nutrient to the plant material; collecting excess water or liquid plant nutrient in the valleys of the tray; and conveying the excess water or liquid plant nutrient into the fluid drainage system via valleys and a gutter disposed on the tray.

Plants that can be grown or cultivated in the method comprise decorative plants such as flowering plants or plants with decorative foliage, such as for example poinsettias, roses, carnations, daffodils, tulips, lilies, chrysanthemums, violets, succulents, cacti, ferns, bromeliads, etc.; or herb or crop plants such as rosemary, oregano, basil, spinach, lettuce, cabbage, kale, *cannabis*, etc. Plants can be propagated or sprouted from seeds, bulbs, tubers, spores, etc., and grown to any stage up to and including full size and maturity in containers placed on the tray system.

What is claimed is:

1. A tray system for plant cultivation, comprising:
   a tray comprising opposed end walls and opposed side walls defining a perimeter of the tray, and a raised region disposed within the perimeter of the tray; and
   a duct assembly comprising one or more air passages having opposed open ends proximate to the end walls of the tray and a plurality of orifices in the one or more air passages to distribute air out of the one or more air passages;
   wherein the end walls of the tray each comprise an opening configured to provide access to one of the open ends of the duct assembly and the side walls of the tray extend below the raised region to hold the raised region above the duct assembly.

2. The tray system of claim 1, wherein the raised region comprises:
   a plurality of ridges disposed between the side walls and a plurality of valleys formed between adjacent ridges of the plurality of ridges, wherein one or more of the plurality of valleys are in fluid communication with a gutter; and
   one or more of a plurality of holes in one or more of the plurality of ridges.

3. The tray system of claim 2, wherein,
   the plurality of alternating parallel ridges comprise top surfaces defining a level plane for supporting one or more individual growing containers for containing growth medium and plants, and
   the one or more of the plurality of valleys slope downward from a peak to the gutter proximate to the perimeter of the upper tray, the one or more of the plurality of valleys are in fluid communication with the gutter for channeling fluid collected into the gutter.

4. The tray system of claim 3, wherein,
   the duct assembly further comprises,
   a first elongate side support member and a second elongate side support member each extending between the ends of the tray system, each having a cross-section comprising a top section and a bottom section, the top section being configured to support a bottom surface of the tray below the valleys proximate to the side walls of the tray and engage a top panel of the duct assembly, and the bottom section being configured to engage a bottom panel of the duct assembly, and a center elongate support member having a cross-section comprising a top section and a bottom section, the top section being configured to support a bottom surface of the tray below the valleys proximate to the side walls of the tray and engage a first top panel on a first side and engage a second top panel on a second side, and the bottom section being configured to engage a first bottom panel on the first side and a second bottom panel, wherein the first elongate side support member, the first side of the center support member, the first top panel and the first bottom panel define a first duct in the duct assembly configured to nest below the valleys of the tray in a first region of the tray between the first side support member, and the center support member and the second elongate side support member, the second side of the center support member, the second top panel and the second bottom panel define a second duct in the duct assembly configured to nest below the valleys of the tray in a second region of the tray between the second side support member and the center support member.

5. The tray system of claim 4, wherein the first and second elongate side support members each comprise,
   a top section configured to support the bottom of each of the valleys of the tray proximate to the sides of the tray and a shelf to engage a top panel of the duct assembly, and
   a bottom section comprising a shelf extending toward the central support member configured to engage a bottom panel of the duct assembly.

6. The tray system of claim 2, wherein a set of the plurality of alternating parallel ridges comprises a central boss.

7. The tray system of claim 2, wherein the gutter is configured to be in fluid communication with a fluid drainage system.

8. The tray system of claim 1, wherein the duct assembly comprises a first open end configured to be in fluid communication with a ventilation system and a second open end opposed to the first open end configured to be optionally closed or optionally be in fluid communication with a second duct assembly.

9. The tray system of claim 1, wherein,
   the duct assembly further comprises,
   one or more top panels;
   one or more bottom panels;
   a first elongate side support member and a second elongate side support member,
   each configured perpendicularly to the ridges of the tray and engaged to the one or more top panels and the one or more bottom panels; and
   one or more elongate center support members are configured perpendicularly to the ridges of the tray and engaged with the one or more top panels and the one or more bottom panels, wherein the first and second side support members, the one or more top panels, the one or more bottom panels, and the optional one or more center support members define one or more ducts having open ends proximate to the end walls of the tray.

10. The tray system of claim 9, wherein,
    the duct assembly further comprises,
    a plurality of holes in the one or more top panels configured to be in fluid communication with a plurality of holes in raised region of the tray to direct air from the duct assembly to above the tray; or
    a plurality of holes in the one or more bottom panels configured to direct air from the duct assembly to below the duct assembly; or
    a plurality of holes in the one or more top panels configured to be in fluid communication with a plurality of holes in raised region of the tray to direct air from the duct assembly to above the tray and a plurality of holes in the one or more bottom panels configured to direct air from the duct assembly to below the duct assembly.

11. The tray system of claim 10, wherein,
    the duct assembly further comprises a plurality of holes in the one or more top panels configured to be in fluid communication with the plurality of holes in raised region of the tray to direct air from the duct assembly to above the tray.

12. The tray system of claim 10, wherein,
    the duct assembly further comprises a plurality of holes in the one or more bottom panels configured to direct air from the duct assembly to below the duct assembly.

13. The tray system of claim 10, wherein,
    the duct assembly further comprises,
    a plurality of holes in the one or more top panels configured to be in fluid communication with holes in one or more of the ridges of the tray such that air is directed from the duct assembly to above the tray, and
    a plurality of holes in the one or more bottom panels such that air is directed from the duct assembly to below the duct assembly.

14. The tray system of claim 10, further comprising:
    a duct member disposed above the tray, the duct member comprising a hollow elongate member defining a lumen and a plurality of openings in the hollow elongate member, wherein the lumen and the plurality of openings are in fluid communication with the plurality of holes in the raised region of the tray and the plurality of holes in the one or more top panels of the duct assembly such that air is directed from the duct assembly to above the tray.

15. The tray system of claim 14, wherein the duct member disposed above the tray is disposed parallel to the end walls of the tray.

16. The tray system of claim 14, wherein the duct member disposed above the tray is disposed perpendicular to the end walls of the tray.

17. The tray system of claim 14, further comprising a central support member with a cross-section, comprising:
    (i) a top section configured to support bottom of a peak of each of a plurality of valleys of the tray,
    (ii) a middle section comprising a bar, and
    (iii) a bottom section including a first shelf extending from a first side of the middle bar section, and a second shelf extending from a second side of the middle bar section.

18. The tray system of claim 1, further comprising:
    a first tray system and a second tray system, wherein ends of the first and second tray system are connected to each other to provide an integrated system of a plurality of tray systems.

19. The tray system of claim 1, wherein duct assembly and the tray are configured to rest on a rack system.

* * * * *